United States Patent
Sasaki et al.

(10) Patent No.: US 8,228,462 B2
(45) Date of Patent: Jul. 24, 2012

(54) OPTICAL ELEMENT LAMINATE, BACKLIGHT, AND LIQUID CRYSTAL DISPLAY APPARATUS

(75) Inventors: Jun Sasaki, Miyagi (JP); Satoshi Sekino, Miyagi (JP); Akihiro Horii, Miyagi (JP); Noriyuki Hirai, Miyagi (JP); Katsuhiro Doi, Miyagi (JP); Makoto Aoki, Miyagi (JP)

(73) Assignee: Sony Corporation, Tokyo (JP)

( * ) Notice: Subject to any disclaimer, the term of this patent is extended or adjusted under 35 U.S.C. 154(b) by 222 days.

(21) Appl. No.: 12/538,541

(22) Filed: Aug. 10, 2009

(65) Prior Publication Data
US 2010/0039584 A1     Feb. 18, 2010

(30) Foreign Application Priority Data
Aug. 12, 2008 (JP) ................. 2008-208267

(51) Int. Cl.
*G02F 1/1335* (2006.01)

(52) U.S. Cl. ................. 349/62; 349/58; 349/64; 349/65

(58) Field of Classification Search .......... None
See application file for complete search history.

(56) References Cited

U.S. PATENT DOCUMENTS

| | | | | |
|---|---|---|---|---|
| 6,412,969 | B1 * | 7/2002 | Torihara et al. | 362/609 |
| 2006/0044490 | A1 * | 3/2006 | Ichioka et al. | 349/58 |
| 2008/0205066 | A1 * | 8/2008 | Ohta et al. | 362/311 |
| 2009/0268128 | A1 * | 10/2009 | Yamada | 349/67 |
| 2010/0253874 | A1 * | 10/2010 | Ito et al. | 349/58 |
| 2010/0277670 | A1 * | 11/2010 | Hamada | 349/62 |

FOREIGN PATENT DOCUMENTS
JP    2005-301147    10/2005

* cited by examiner

*Primary Examiner* — Thanh-Nhan P. Nguyen
(74) *Attorney, Agent, or Firm* — K&L Gates LLP

(57) ABSTRACT

An optical element laminate is provided and includes a first optical element and a second optical element superimposed with the first optical element. The first optical element and the second optical element are each a rectangular film or sheet. The first optical element has at least two side walls at two opposing sides among four sides of the first optical element and the second optical element has at least two side walls at two opposing sides among four sides of the second optical element.

8 Claims, 22 Drawing Sheets

OPTICAL ELEMENT LAMINATE, BACKLIGHT, AND LIQUID CRYSTAL DISPLAY APPARATUS

CROSS REFERENCES TO RELATED APPLICATIONS

The present application claims priority to that disclosed in Japanese Priority Patent Application JP 2008-208267 filed in the Japan Patent Office on Aug. 12, 2008, the entire content of which is hereby incorporated by reference.

BACKGROUND

The present disclosure relates to an optical element laminate, a backlight including the optical element laminate, and a liquid crystal device including the optical element laminate. In particular, it relates to an optical element laminate that improves display characteristics of a liquid crystal display apparatus.

A large number of optical elements have been used in liquid crystal display apparatuses to improve viewing angle, luminance, and other properties. Examples of such optical elements include sheet-like optical elements such as diffuser sheets and prism sheets.

FIG. 1 shows a structure of a liquid crystal display apparatus of related art. As shown in FIG. 1, the liquid crystal display apparatus includes a lighting device 101 configured to emit light, a diffuser plate 102 configured to diffuse light emitted from the lighting device 101, a plurality of optical elements 103 configured to condense or diffuse light diffused with the diffuser plate 102, and a liquid crystal panel 104.

In recent years, as the size of liquid crystal display apparatus increases, the deadweight and size of optical elements are also showing an increasing tendency. The increase in deadweight and size of optical elements causes deformation of optical elements because the stiffness of the optical elements is insufficient. The deformation of the optical elements affects optical directivity to display surfaces and inflicts a serious problem of nonuniform luminance when viewed from an oblique angle.

It has been suggested that the insufficient stiffness of optical elements can be overcome by making the optical element thicker. However, increasing the thickness of the optical elements increases the thickness of liquid crystal display apparatuses, and advantages of thin, light-weight liquid crystal display apparatuses will be lost. A suggestion is then made to resolve insufficient stiffness of sheet- or film-shaped optical elements by bonding the optical elements to one another with a transparent adhesive (e.g., refer to Japanese Unexamined Patent Application Publication No. 2005-301147).

However, according to the technique disclosed in Japanese Unexamined Patent Application Publication No. 2005-301147, the optical elements are bonded to each other with a transparent adhesive. Thus, the thickness of the liquid crystal display apparatus increases, although the increase in thickness is not as significant as that yielded by the improvement technique of increasing the thickness of the optical elements themselves. There is also a risk that the display characteristics of the liquid crystal display may be deteriorated by the transparent adhesive.

Thus, it is desirable to provide an optical element laminate by which the insufficient strength of optical elements can be overcome while suppressing the increase in thickness of liquid crystal display apparatuses and by which deterioration of the display characteristics of liquid crystal display apparatuses can be suppressed. It is also desirable to provide a backlight and a liquid crystal display apparatus each incorporating such an optical element laminate.

SUMMARY

A first embodiment provides an optical element laminate that includes a first optical element and a second optical element superimposed with the first optical element. The first optical element and the second optical element are each a rectangular film or sheet. The first optical element has at least two side walls at two opposing sides among four sides of the first optical element and the second optical element has at least two side walls at two opposing sides among four sides of the second optical element.

A second embodiment provides a backlight that includes a light source configured to emit light and an optical element laminate through which light from the light source passes. The optical element laminate includes a first optical element and a second optical element superimposed with the first optical element. The first optical element and the second optical element are each a rectangular film or sheet. The first optical element has at least two side walls at two opposing sides among four sides of the first optical element and the second optical element has at least two side walls at two opposing sides among four sides of the second optical element.

A third embodiment provides a liquid crystal display apparatus that includes a backlight configured to emit light and a liquid crystal panel configured to display images on the basis of light emitted from the backlight. The backlight includes a light source configured to emit light and an optical element laminate through which light from the light source passes. The optical element laminate includes a first optical element and a second optical element superimposed with the first optical element. The first optical element and the second optical element are each a rectangular film or sheet. The first optical element has at least two side walls at two opposing sides among four sides of the first optical element and the second optical element has at least two side walls at two opposing sides among four sides of the second optical element.

According to the embodiments, since the first optical element has at least two side walls at two opposing sides among four sides of the first optical element and the second optical element has at least two side walls at two opposing sides among four sides of the second optical element, the second moment of area can be increased. Therefore, the strengths of the first optical element and the second optical element can be enhanced.

As described above, according to the embodiments, the insufficient strength of optical elements can be overcome while suppressing the increase in thickness of liquid crystal display apparatuses. Deterioration of the display characteristics of liquid crystal display apparatuses can also be suppressed.

Additional features and advantages are described herein, and will be apparent from the following Detailed Description and the figures.

DETAILED DESCRIPTION

Figure 1:
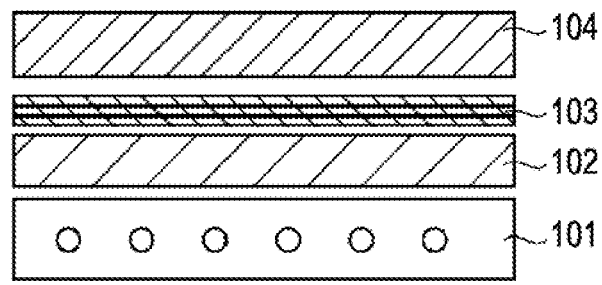
FIG. 1 is a schematic diagram showing a structure of a liquid crystal display apparatus of related art.

Embodiments will now be described with reference to the drawings. Note that in all drawings referred to in the embodiments described below, the same or corresponding components are represented by the same reference characters.

1. First Embodiment 1.1. Structure of Liquid Crystal Display Apparatus

Figure 2:
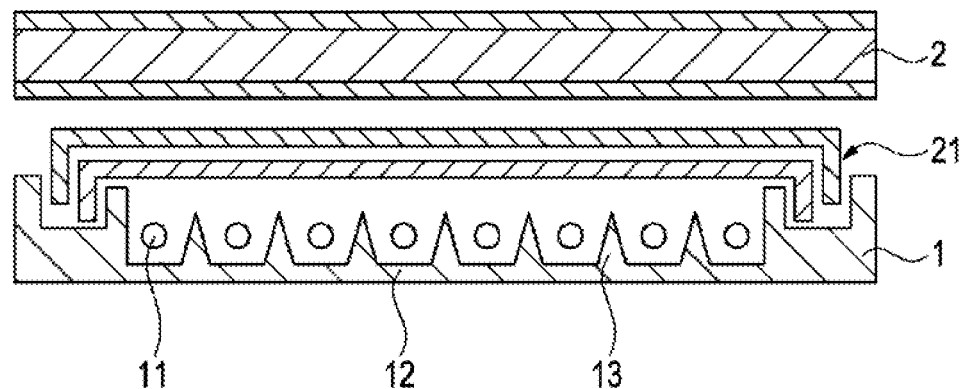
FIG. 2 is a schematic view showing an example of a structure of a liquid crystal display apparatus according to a first embodiment.

FIG. 2 shows an example of a structure of a liquid crystal display apparatus according to a first embodiment. As shown in FIG. 1, the liquid crystal display apparatus includes a backlight 1 configured to emit light and a liquid crystal panel 2 configured to display images on the basis of light emitted from the backlight 1.

Liquid Crystal Panel

The liquid crystal panel 2 displays images by temporally and spatially modulating the light emitted from the backlight 1. Examples of the usable display mode for the liquid crystal panel 2 include a twisted nematic (TN) mode, a super twisted nematic (STN) mode, a vertically aligned (VA) mode, an in-plane switching (IPS) mode, an optically compensated birefringence (OCB) mode, a ferroelectric liquid crystal (FLC) mode, a polymer dispersed liquid crystal (PDLC) mode, and a phase change guest host (PCGH) mode.

Backlight

The backlight 1 is a direct-type lighting device that includes a plurality of light sources 11 configured to emit light, an optical element laminate 21 configured to adjust the characteristics of light emitted from the light sources 11 and to emit light toward the liquid crystal panel 2, and a casing 12 configured to house the light sources 11 and the optical element laminate 21. The casing 12 has a plurality of stud pins 13 that support the optical element laminate 21. The stud pins 13 need not be provided densely in the central portion and may be intentionally disposed in outer regions. In such a case, the number of stud pins 13 is left unchanged and a particular percentage of stud pins 13 are arranged not at the central portion but at the outer regions.

Examples of the light sources 11 include line light sources such as cold cathode fluorescent lamps (CCFL) and hot cathode fluorescent lamps (HCFL), and point light sources such as organic electroluminescence (OEL), inorganic electroluminescence (IEL), and light-emitting diodes (LED).

Optical Element Laminate

Figure 3:
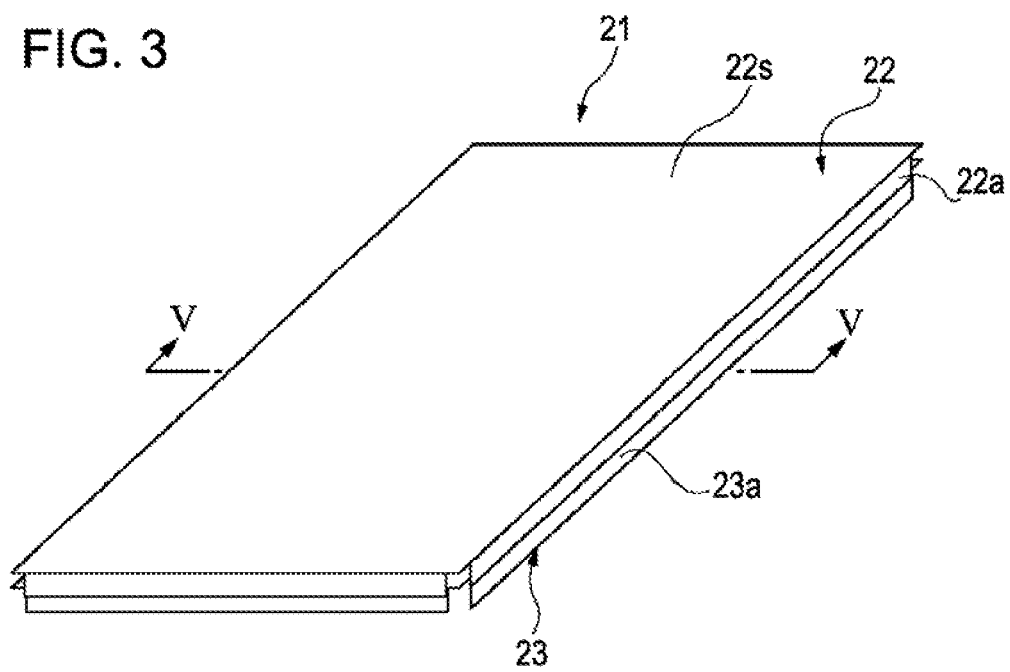
FIG. 3 is a perspective view showing an example of a structure of an optical element laminate according to the first embodiment.
Figure 4:
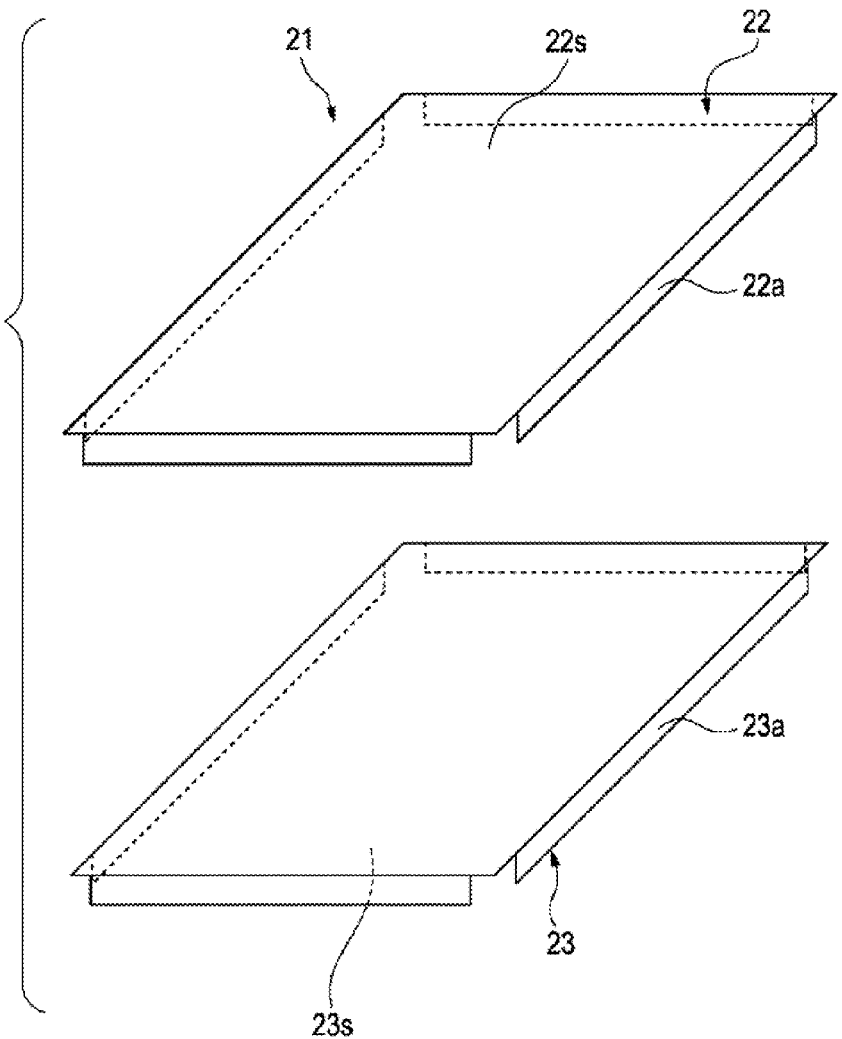
FIG. 4 is an exploded perspective view showing an example of a structure of an optical element laminate according to the first embodiment.
Figure 5:
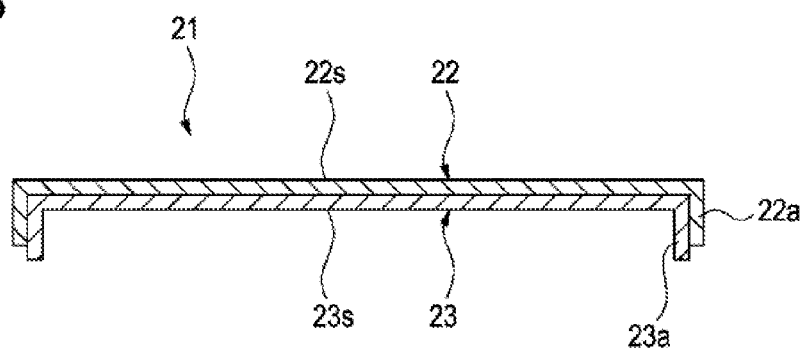
FIG. 5 is a cross-sectional view of the optical element laminate shown in FIG. 3 taken along line V-V in FIG. 3.

FIG. 3 is a perspective view showing an example of a structure of an optical element laminate according to the first embodiment. FIG. 4 is an exploded perspective view showing an example of a structure of an optical element laminate according to the first embodiment. FIG. 5 is a cross-sectional view of the optical element laminate shown in FIG. 3 taken along line V-V in FIG. 3.

The optical element laminate 21 is prepared by laminating film- or sheet-shaped first optical element 22 and second optical element 23. The first optical element 22 and the second optical element 23 laminated are preferably in close contact with each other. The first optical element 22 has a rectangular main surface member 22s and four side walls 22a respectively installed upright at four sides of the main surface member 22s. Similarly, the second optical element 23 has a rectangular main surface member 23s and four side walls 23a respectively installed upright at four sides of the main surface member 23s. The first optical element 22 is superimposed on the second optical element 23 so that the side walls 22a extend in the same direction as the side walls 23a. Preferably, at least one of the first optical element 22 and the second optical element 23 is mainly composed of an amorphous thermoplastic resin.

The main surface member 22s of the first optical element 22 has an inner surface facing the second optical element 23 and an outer surface at the opposite side. At least one of the inner surface and the outer surface of the main surface member 22s is imparted with features such as lens-shaped features or emboss-shaped features. Moreover, a filler may be added to the interior of the main surface member 22s.

The main surface member 23s of the second optical element 23 has an inner surface facing the first optical element 22 and an outer surface at the opposite side. At least one of the inner surface and the outer surface of the main surface member 23s is imparted with features such as lens-shaped features or emboss-shaped features. Moreover, a filler may be added to the interior of the main surface member 23s.

Figure 6A:
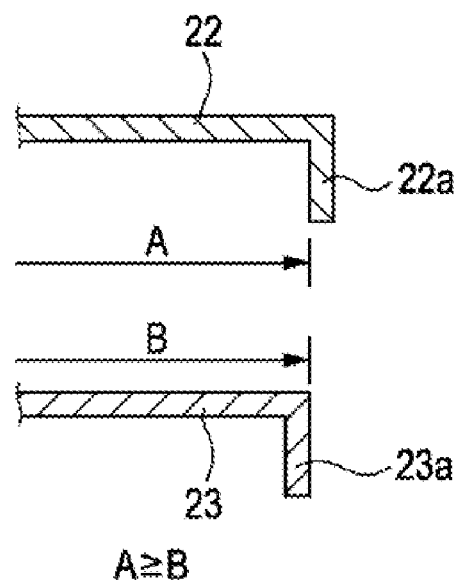
FIGS. 6A to 6C are enlarged cross-sectional views of side walls of the optical element laminate.
Figure 6B:
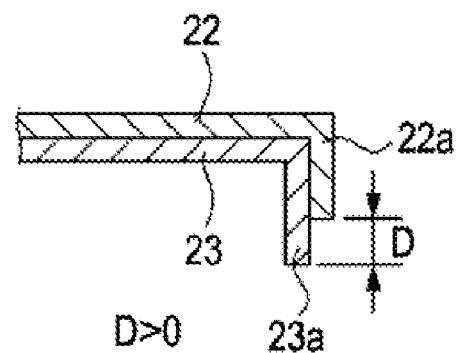
Figure 6C:
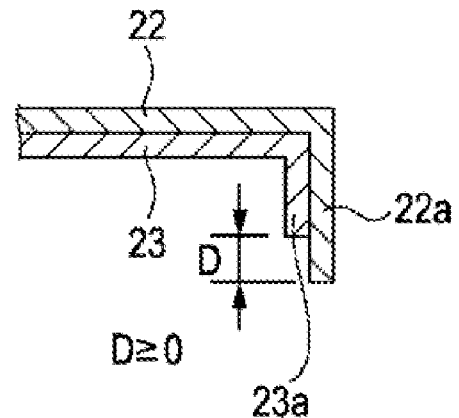

FIGS. 6A to 6C are enlarged views of side walls of the optical element laminate. As shown in FIG. 6A, the position of the side wall 23a of the second optical element 23 is not particularly limited and may be any position at the inner side of the side wall 22a of the first optical element 22. As shown in FIGS. 6B and 6C, the side wall 22a of the first optical element 22 covers all or part of the side wall 23a of the second optical element 23.

Figure 7:
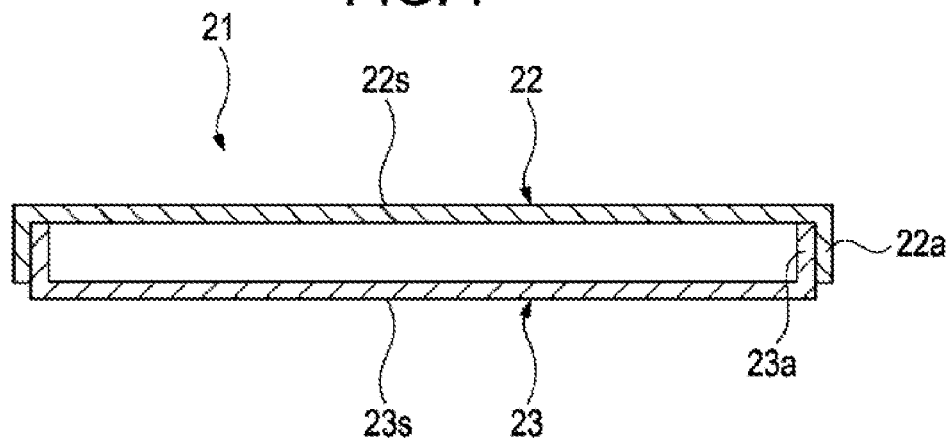
FIG. 7 is a cross-sectional view showing a modification of a structure of an optical element laminate according to the first embodiment.
Figure 8:
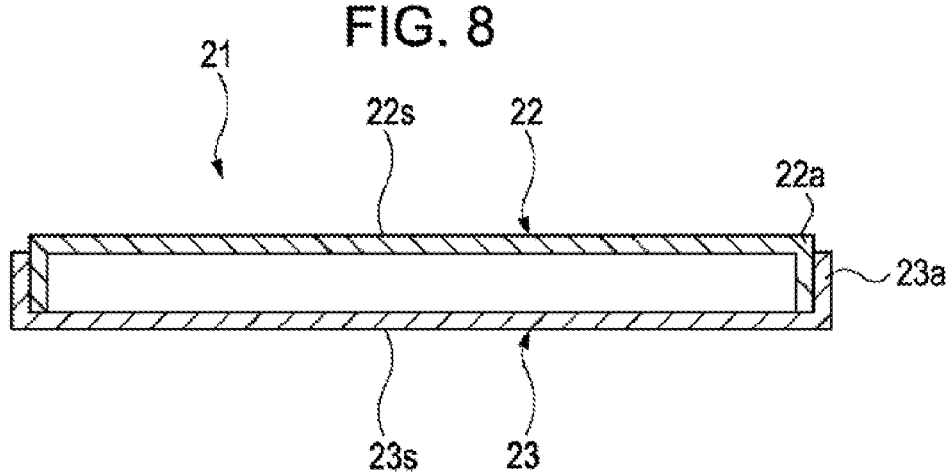
FIG. 8 is a cross-sectional view showing another modification of an optical element laminate according to the first embodiment.

As shown in FIGS. 7 and 8, the first optical element 22 and the second optical element 23 may be superimposed on each other so that the side walls 22a of the first optical element 22 extend in a direction opposite to the direction in which the side walls 23a of the second optical element 23 extend.

Figure 9:
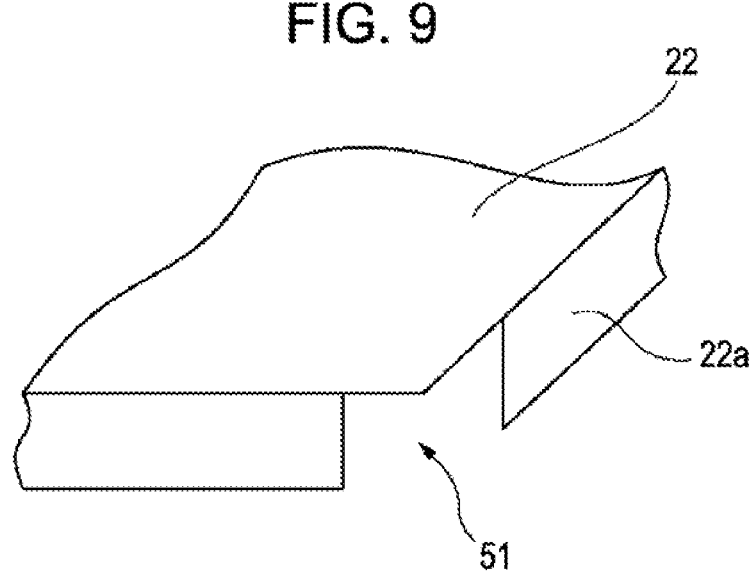
FIG. 9 is an enlarged perspective view of a corner of a first optical element.

FIG. 9 is an enlarged view of a corner of the first optical element 22. As shown in FIG. 9, preferably, no side walls 22a but an open part 51 is provided at the corner of the first optical element 22. This is because, when the side walls 22a is formed by bending the side portions of the first optical element 22, it becomes easy to bend the side portions of the first optical element 22.

Although only the first optical element 22 is described here, the second optical element 23 preferably has the same shape. The structure and shape of the first optical element 22 described below equally apply to the second optical element 23.

Figure 10:
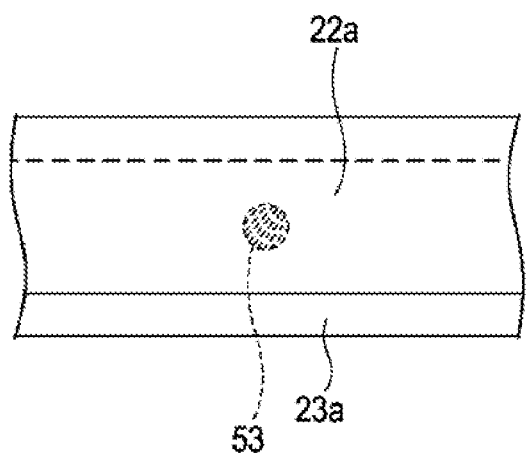
FIG. 10 is an enlarged side view of a side wall of an optical element laminate.
Figure 11:
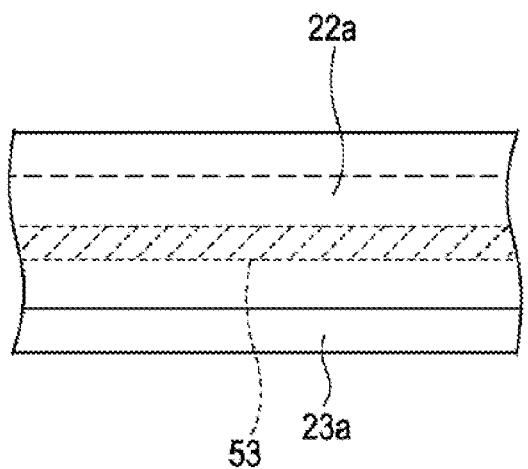
FIG. 11 is an enlarged side view of a side wall of an optical element laminate.

FIGS. 10 to 11 are enlarged views of a side wall of the optical element laminate. As shown in FIG. 10, the side wall 22a of the first optical element 22 and the side wall 23a of the second optical element 23 are preferably superimposed on each other and spot-welded to form a joint 53. Alternatively, as shown in FIG. 11, the side wall 22a of the first optical element 22 and the side wall 23a of the second optical element 23 are joined in a linear manner to form a joint 53. Examples of the technique used for joining include bonding and welding. Examples of the bonding technique include a hot-melt bonding technique, a thermosetting bonding technique, a pressure-sensitive (adhesion) bonding technique, an energy line-setting bonding technique, a hydration bonding technique, and a hygroscopic/remoistening bonding technique. Examples of the welding technique include a thermal welding technique, an ultrasonic welding technique, and a laser welding technique.

Figure 12:
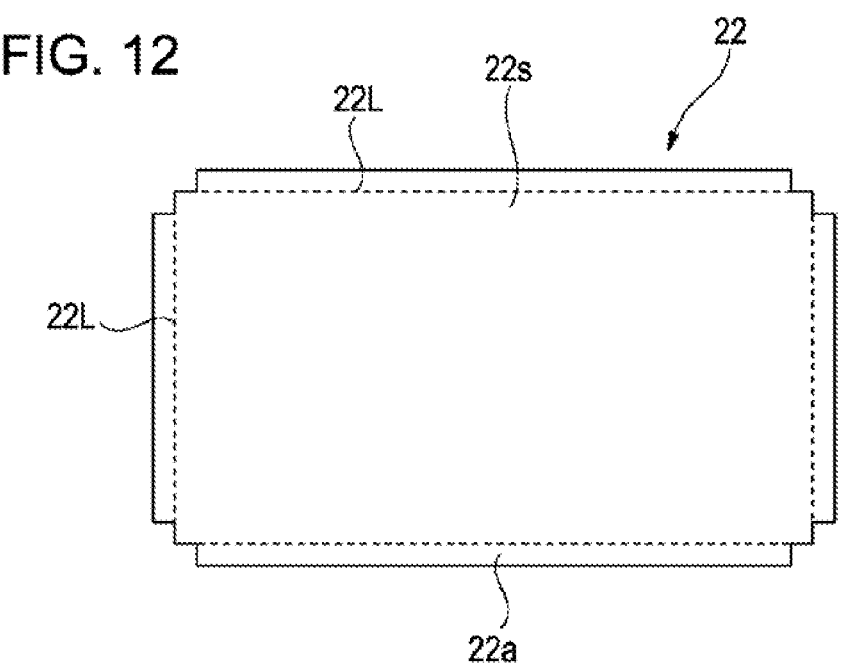
FIG. 12 is an expansion plan of the first optical element.

FIG. 12 is an expansion plan of the first optical element 22. As shown in FIG. 12, bend lines 22L for facilitating the bending of the side portions are provided at the borders between the main surface member 22s and the side walls 22a of the first optical element 22. The bend lines 22L are formed by, for example, making shallow slits along the borders of the main surface member 22s and the side walls 22a of the first optical element 22.

1.2. Optical Elements

Examples of the structure of the first optical element 22 will now be described with reference to FIGS. 13 to 20.

First Structural Example

Figure 13:
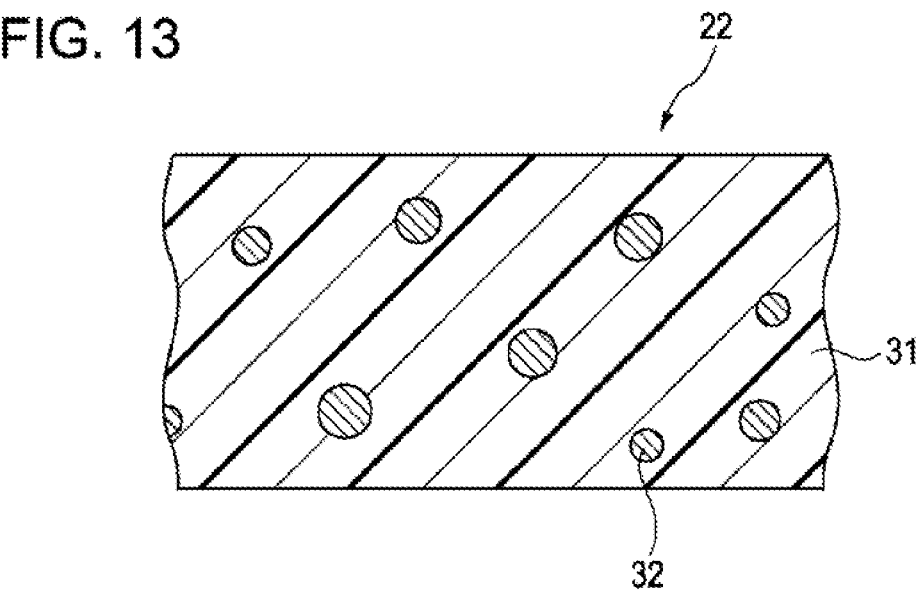
FIG. 13 is a cross-sectional view showing a first structural example of an optical element according to the first embodiment.

FIG. 13 shows a first structural example of the first optical element 22 according to the first embodiment. As shown in FIG. 13, the first optical element 22 is constituted by a base layer 31 containing a polymer material and a filler 32. The base layer 31 is, for example, sheet-shaped or film-shaped. A publicly available polymer material may be used as the material for the base layer 31. Examples of the publicly available polymer material include triacetyl cellulose (TAC), polyesters (TPEE), polyethylene terephthalate (PET), polyimide (PI), polyamide (PA), aramid, polyethylene (PE), polyacrylate, polyethersulfone, polysulfone, polypropylene (PP), diacetyl cellulose, polyvinyl chloride, acryl resins (PMMA), polycarbonate (PC), epoxy resins, urea resins, urethane resins, and melamine resins.

When the first optical element 22 includes a plurality of layers, at least one layer should contain the filler 32. The material for the filler 32, which is a diffusing agent, is not particularly limited and may be any material having a refractive index different from that of the polymer material which is the main component of the base layer 31. The material may be adequately selected on the basis of the desirable diffusibility. In particular, acryl particles, polystyrene particles, calcium carbonate, and oxides such as titania and silica may be used as the filler 32. A gas such as air or an inert gas or a liquid such as water, an alcohol, or a gel can also be used as the filler 32. The first optical element 22 can be obtained by preparing the polymer material and the filler 32, forming the prepared polymer material and filler into a film or sheet by melt extrusion or the like, and stretching and heat-treating the resultant film or sheet as needed.

Second Structural Example

Figure 14:
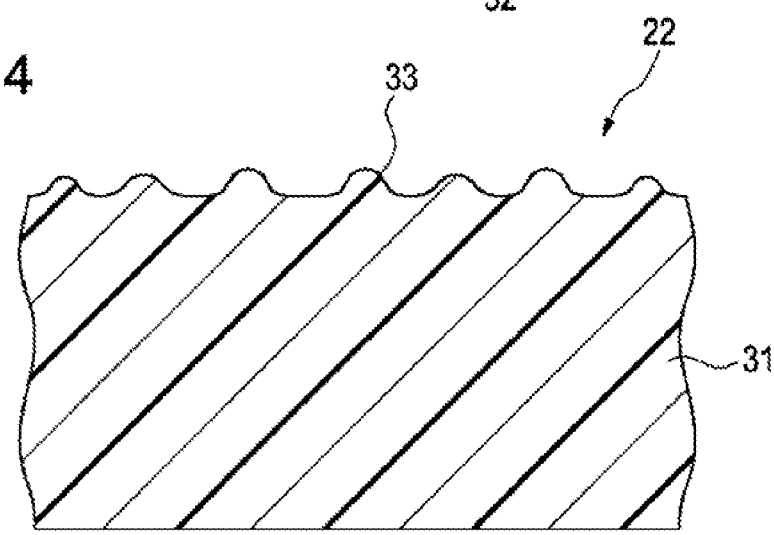
FIG. 14 is a cross-sectional view showing a second structural example of an optical element according to the first embodiment.

FIG. 14 shows a second structural example of the first optical element 22 according to the first embodiment. As shown in FIG. 14, irregularities 33 are formed in the surface of the base layer 31 by embossing. The irregularities 33 are preferably formed at random. Alternatively, as in the first structural example, the base layer 31 itself may contain a filler that serves as a diffusing agent.

Third Structural Example

Figure 15:
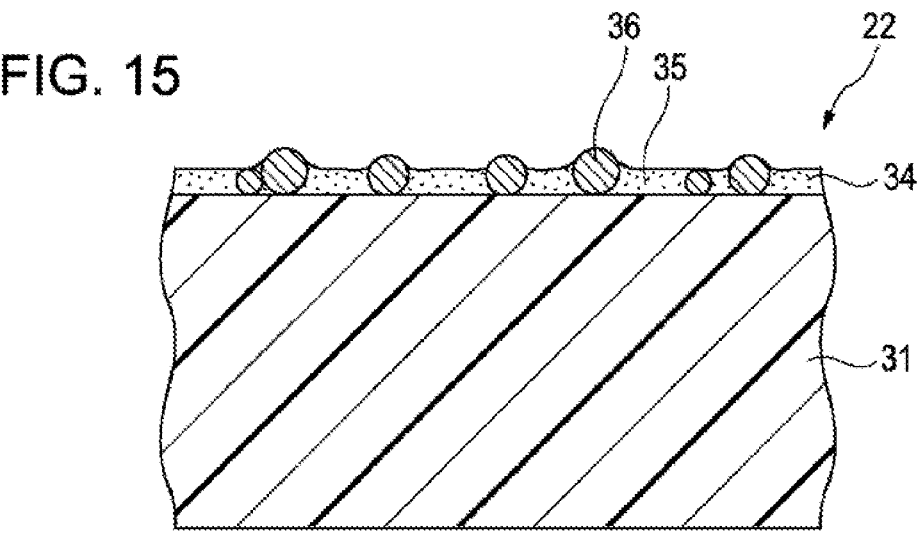
FIG. 15 is a cross-sectional view showing a third structural example of an optical element according to the first embodiment.

FIG. 15 shows a third structural example of the first optical element 22 according to the first embodiment. As shown in FIG. 15, the first optical element 22 has the base layer 31 and a diffusing layer 34 disposed on the surface of the base layer 31. Preferably, the diffusing layer 34 is arranged to face the liquid crystal panel 2. The diffusing layer 34 is mainly composed of a binder 35 and a filler 36 having a refractive index different from that of the binder 35. Preferably, irregularities are formed in the surface by the filler 36 projecting from the surface of the diffusing layer 34. The size and shape of the filler 36 are not particularly limited and may be adequately selected according to the desired characteristics. Examples of the material for the filler 36 include polymethyl methacrylate, polystyrene, titanium oxide, silica, and calcium carbonate but are not limited to these. Any material that has a refractive index different from that of the binder 35 may be used. The binder 35 is preferably a material that has good adhesion to the base layer 31 and capability to have the filler 36 dispersed therein. For example, an acryl polymer can be used. The diffusing layer 34 can be formed by, for example, mixing the filler 36, the binder 35, and, if necessary, a solvent to prepare a coating material, applying the coating material on the base layer 31, drying the applied material as needed, and curing the applied material.

Fourth Structural Example

Figure 16:
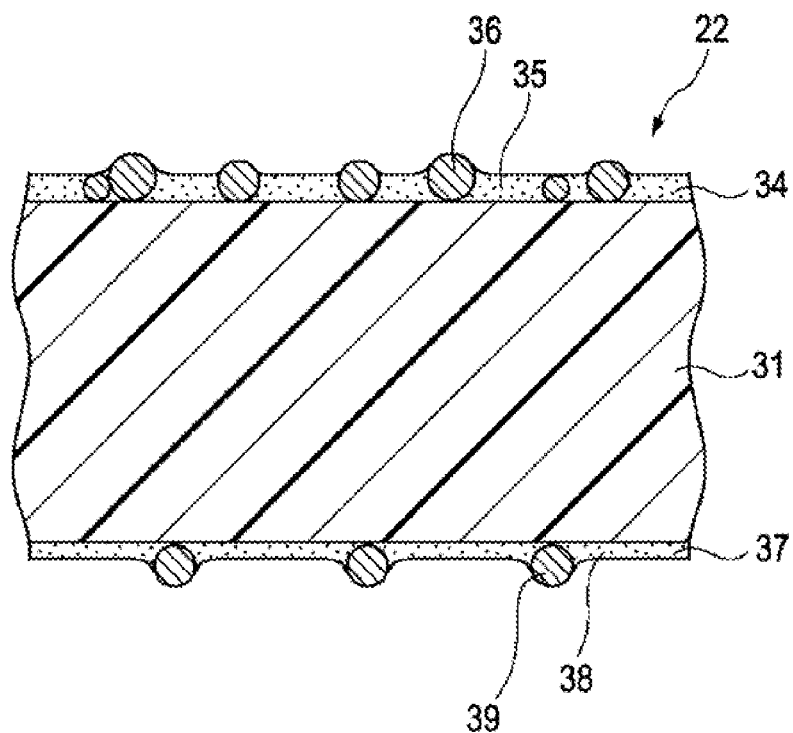
FIG. 16 is a cross-sectional view showing a fourth structural example of an optical element according to the first embodiment.

FIG. 16 shows a fourth structural example of the first optical element 22 according to the first embodiment. As shown in FIG. 16, the first optical element 22 differs from that of the third structural example in that another diffusing layer 37 is disposed at the opposite side of the diffusing layer 34. The diffusing layer 37 is mainly composed of a binder 38 and a filler 39 having a refractive index different from that of the binder 38. Preferably, irregularities are formed in the surface by the filler 39 projecting from the surface of the diffusing layer 38. The same binder and filler as in the first structural example may be used as the binder 38 and the filler 39.

Fifth Structural Example

Figure 17:
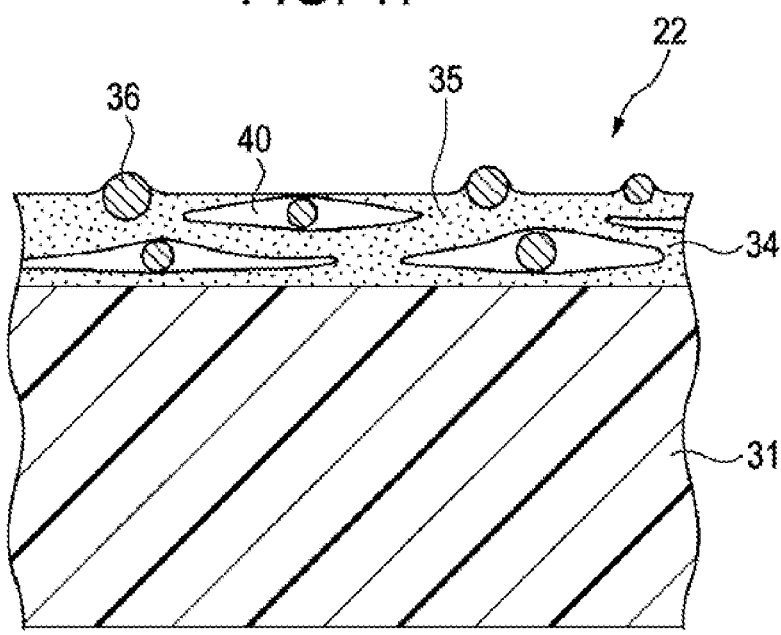
FIG. 17 is a cross-sectional view showing the fourth structural example of the optical element according to the first embodiment.

FIG. 17 shows a fifth structural example of the first optical element 22 according to the first embodiment. As shown in FIG. 17, the first optical element 22 differs from that of the third structural example in that voids 40 are formed around the filler 36. Preferably, irregularities are formed in the surface by the filler 36 projecting from the surface of the diffusing layer 34. Examples of the shape of the voids 40 include, but are not limited to, a disc shape, an ellipsoidal shape, a cubic shape, etc. Any suitable shape may be selected according to the desired diffusion performance. The shape and the size of the voids 40 may be controlled according to the viewing angle of the liquid crystal panel 2.

Sixth Structural Example

Figure 18:
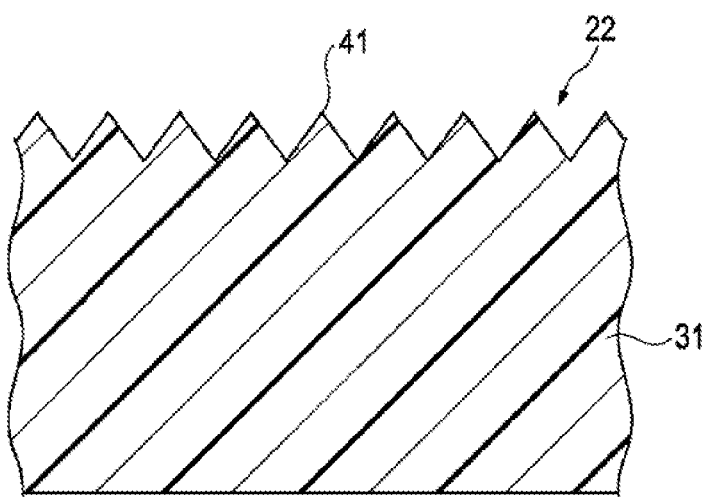
FIG. 18 is a cross-sectional view showing a fifth structural example of an optical element according to the first embodiment.

FIG. 18 shows a sixth structural example of the first optical element 22 according to the first embodiment. As shown in FIG. 18, the first optical element 22 differs from that of the second structural example in that lens profile 41 is formed in the surface of the base layer 31. The lens profile 41 can be obtained by, for example, pressing a mold having a surface with a lens profile or the like onto the base layer 31. During this process, at least one of the base layer 31 and the mold is preferably heated.

Alternatively, the first optical element 22 may be stretched in the ridgeline direction of the lens to impart, optical anisotropy to the first optical element 22.

Seventh Structural Example

Figure 19:
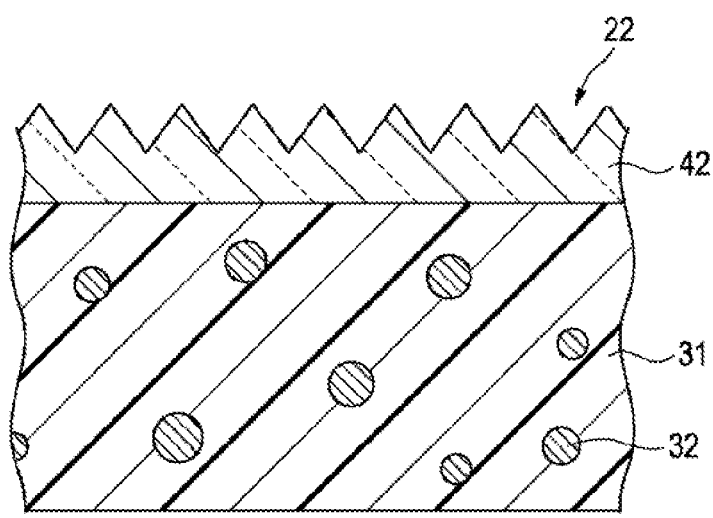
FIG. 19 is a cross-sectional view showing a sixth structural example of an optical element according to the first embodiment.

FIG. 19 shows a seventh structural example of the first optical element 22 according to the first embodiment. As shown in FIG. 19, the first optical element 22 differs from that of the first structural example in that a lens layer 42 is further provided on the surface of the base layer 31. The lens layer 42 can be obtained as follows, for example. First, a photosensitive resin, such as a UV-curable resin, is applied on the base layer 31. Then a mold having a surface having a lens profile or the like is pressed against the photosensitive, resin, and the photosensitive resin is cured by applying light such as UV light.

Eighth Structural Example

Figure 20:
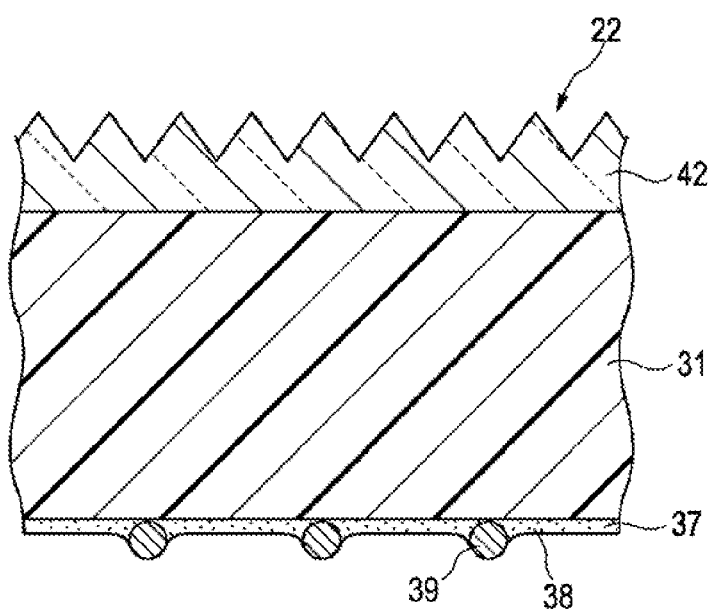
FIG. 20 is a cross-sectional view showing a seventh structural example of an optical element according to the first embodiment.

FIG. 20 shows an eighth structural example of the first optical element 22 according to the first embodiment. As shown in FIG. 20, the first optical element 22 differs from that of the first structural example in that the lens layer 42 is disposed instead of the diffusing layer 34 on one surface of the base layer 31.

1.3. Method for Making Optical Element Laminate

Next, one example of a method for making the optical element laminate 21 having the above-described structure is described with reference to FIGS. 21A to 22.

Figure 21A:
FIGS. 21A to 21C are process diagrams illustrating one example of a method for making an optical element laminate according to the first embodiment.
Figure 21B:
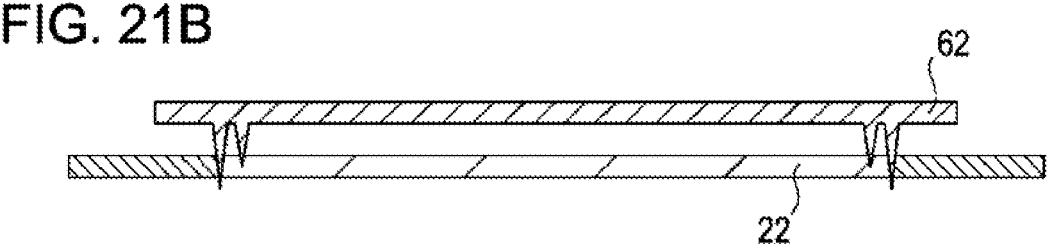
Figure 21C:
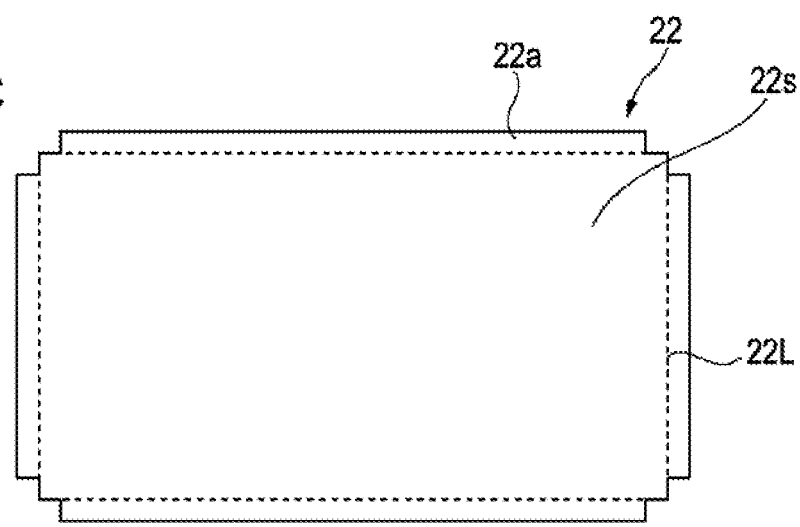
Figure 22:
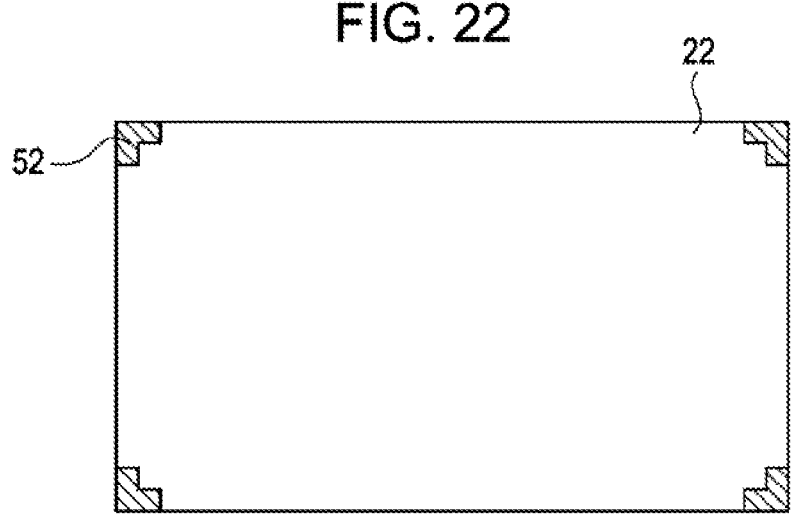
FIG. 22 is a plan view illustrating one example of a method for making an optical element laminate according to the first embodiment.

First, as shown in FIG. 21A, a strip-shaped optical film 61 is prepared, for example. Next, as shown in FIG. 21B, the optical film 61 is punched out with a cutting die 62 while making shallow slits at the borders between the main surface member 22s and the side walls 22a to form the bend lines 22L as further shown in FIG. 21C. As a result of this step, as shown in FIG. 22, regions 52 corresponding to the corners of the rectangle are punched out. Next, the side walls 22a are bended along the bend lines 22L so that the side walls 22a rise substantially at a right angle with respect to the main surface member 22s. As a result, the first optical element 22 is formed. Then the second optical element 23 is formed in the same manner as the first optical element 22. Then the first optical element 22 and the second optical element 23 are laminated and, if necessary, the side walls 22a of the first optical element 22 and the side walls 23a of the second optical element 23 are joined.

As a result, a target optical element laminate 21 is obtained.

2. Second Embodiment

Figure 23:
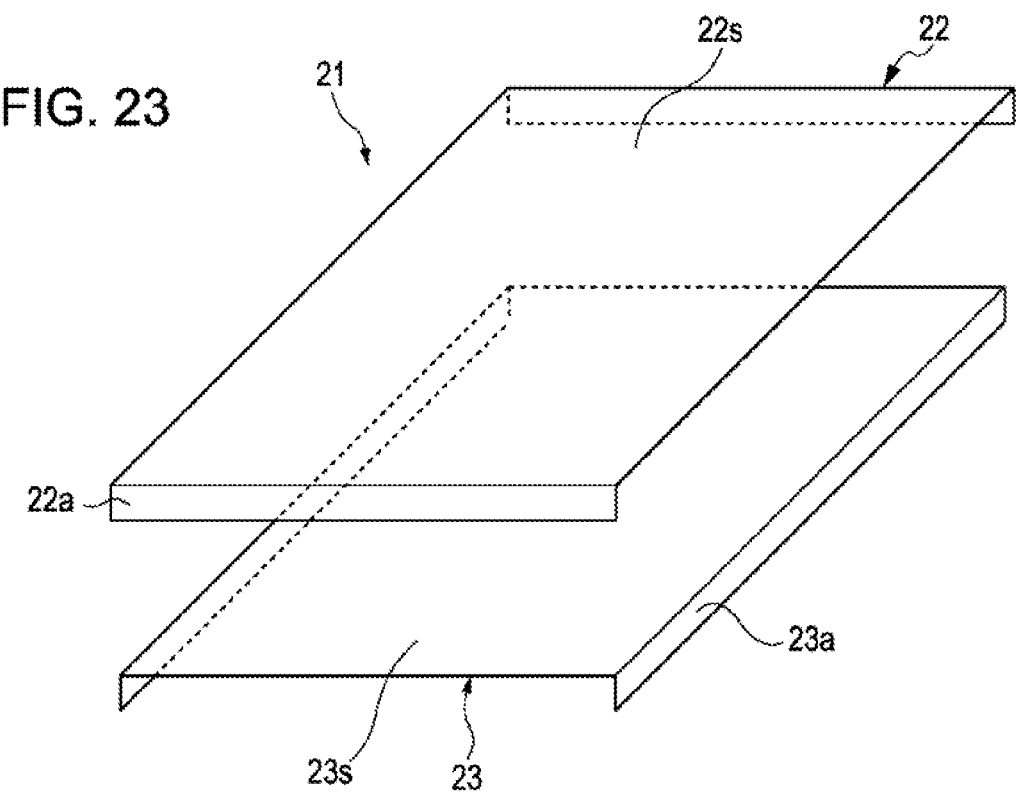
FIG. 23 is an exploded perspective view showing an example of a structure of an optical element laminate according to a second embodiment.

FIG. 23 shows a structural example of an optical element laminate 21 according to a second embodiment. As shown in FIG. 23, the first optical element 22 has a rectangular main surface member 22s and two side walls 22a formed at two opposing sides of the main surface member 22s among the four sides of the main surface member 22s. Similarly, a second optical element 23 has a rectangular main surface member 23s and two side walls 23a formed at two opposing sides of the main, surface member 23s among the four sides of the main surface member 23s. The first optical element 22 is superimposed on the second optical element 23 so that the side walls 22a extend in the same direction as the side walls 23a. Preferably, the side walls 22a of the first optical element 22 and the side walls 23a and the second optical element 23 are assembled to form four side walls. This is because the strength of the optical element laminate 21 can be further improved.

Figure 24:
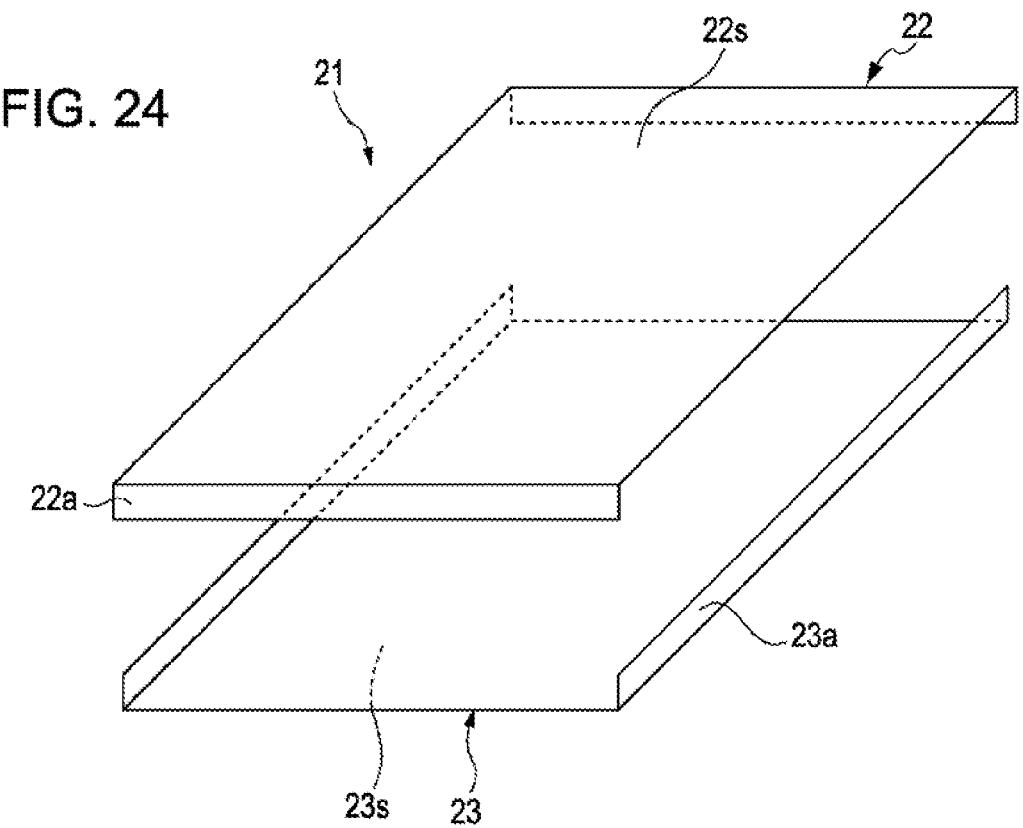
FIG. 24 is an exploded perspective view showing a modification of an optical element laminate according to the second embodiment.

Alternatively, as shown in FIG. 24, the first optical element 22 and the second optical element 23 may be superimposed on each other so that the side walls 22a of the first optical element 22 extend in a direction opposite to the direction in which the side walls 23a of the second optical element 23 extend.

The rest of the structure of the second embodiment is the same as the first embodiment.

3. Third Embodiment

Figure 25:
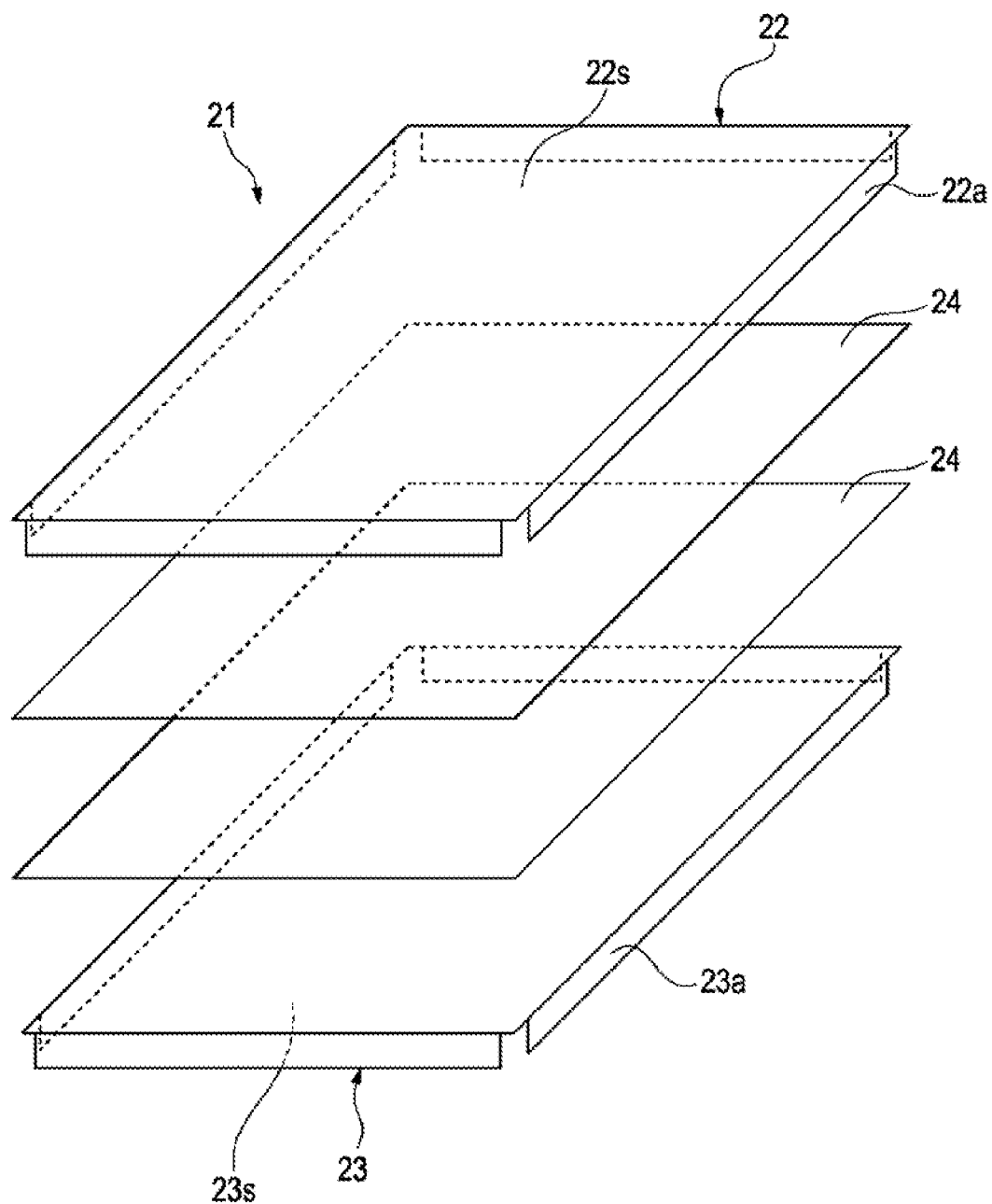
FIG. 25 is an exploded perspective view showing an example of a structure of an optical element laminate according to a third embodiment.
Figure 26:
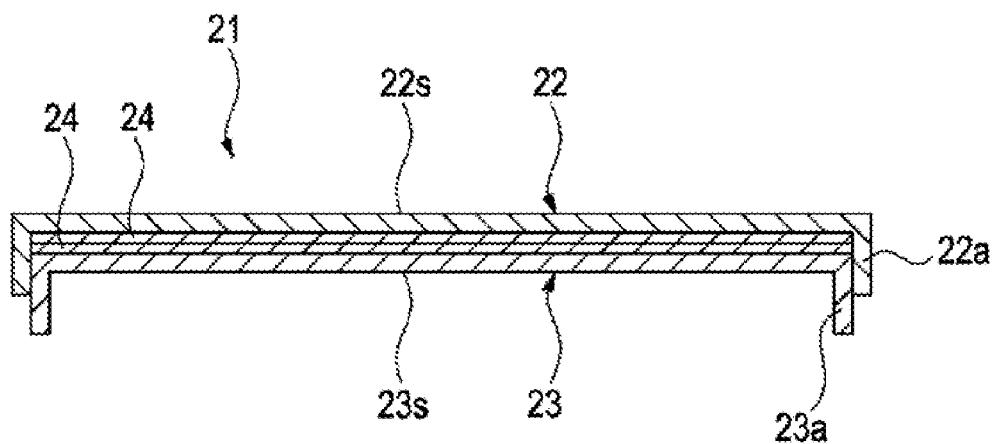
FIG. 26 is a cross-sectional view showing an example of a structure of the optical element laminate according to the third embodiment.

FIG. 25 is an exploded perspective view showing an example of a structure of an optical element laminate 21 according to a third embodiment. FIG. 26 is a cross-sectional view showing this example of the optical element laminate 21 according to the third embodiment. As shown in FIGS. 25 and 26, the optical element laminate 21 includes one or more rectangular optical elements 24 housed in a space between the first optical element 22 and the second optical element 23. The optical elements 24 are film- or sheet-shaped. Preferably, the first optical element 22 and the second optical element 23 are in close contact with the one or more optical elements 24 housed in the space.

Figure 27:
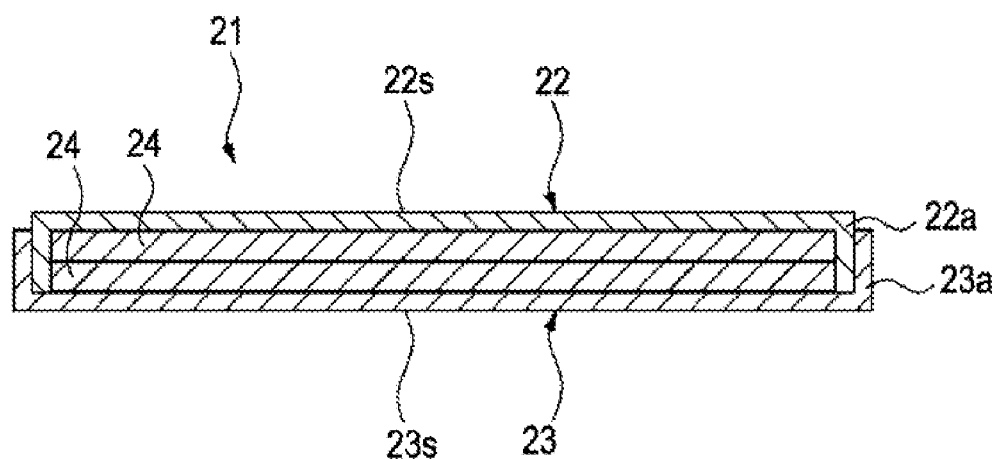
FIG. 27 is a cross-sectional view showing a modification of an optical element laminate according to the third embodiment.

Alternatively, as shown in FIG. 27, the first optical element 22 and the second optical element 23 may be superimposed on each other so that the side walls 22a of the first optical element 22 extend in a direction opposite to the direction in which the side walls 23a of the second optical element 23 extend to thereby form a space for housing the one or more optical elements 24.

The rest of the structure of the third embodiment is the same as the first embodiment.

4. Fourth Embodiment

Figure 28:
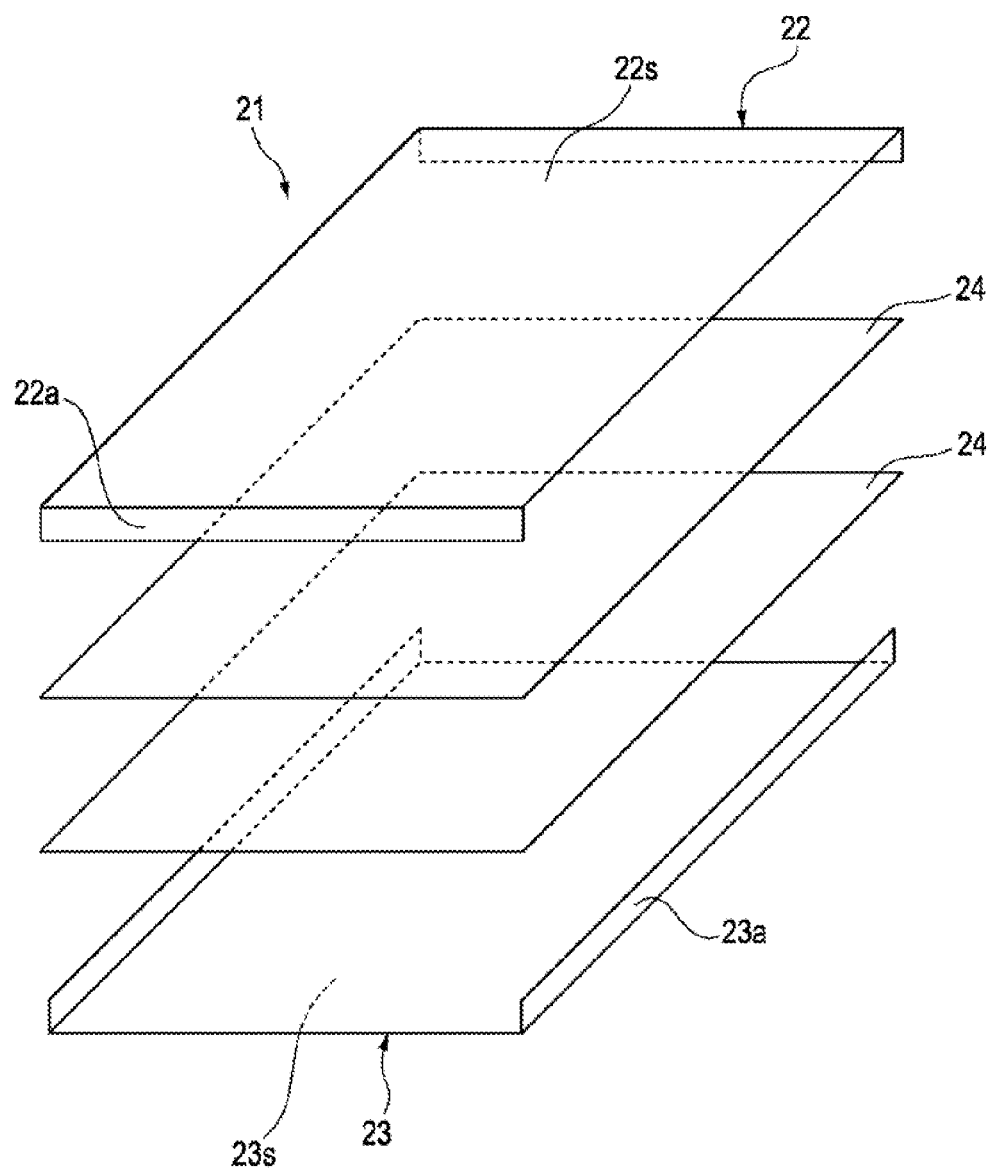
FIG. 28 is an exploded perspective view showing an example of a structure of an optical element laminate according to a fourth embodiment.

FIG. 28 is an exploded perspective view showing an example of a structure of an optical element laminate 21 according to a fourth embodiment. As shown in FIG. 28, a first optical element 22 has two side walls 22a disposed at two opposing sides. Similarly, a second optical element 23 has two side walls 23a disposed at two opposing sides. When the first optical element 22 is superimposed on the second optical element 23, a housing space is defined by the main surface member 22s and the side walls 22a of the first optical element 22 and the main surface member 23s and the side walls 23a of the second optical element 23. One or more optical elements 24 are housed in this housing space. The periphery of the optical elements 24 is completely enclosed as the side walls 22a of the first optical element 22 and the side walls 23a of the second optical element 23 are assembled.

The rest of the structure of the fourth embodiment is the same as the second embodiment.

5. Fifth Embodiment

Figure 29:
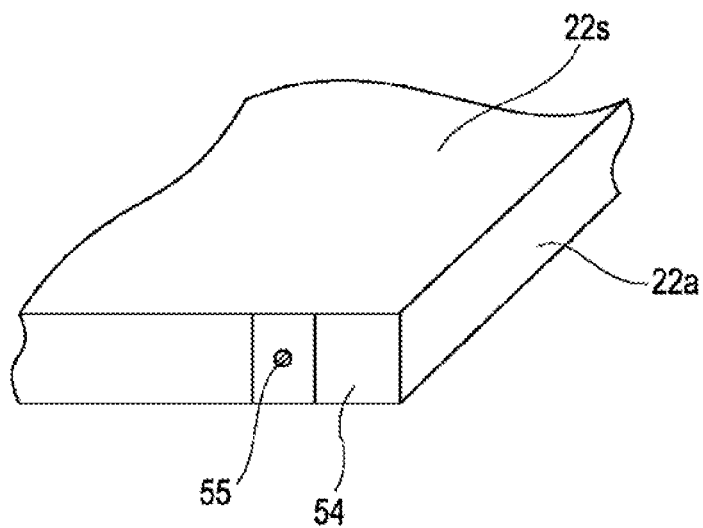
FIG. 29 is an enlarged perspective view showing a corner of an optical element according to a fifth embodiment.

FIG. 29 is an enlarged view of a corner of a first optical element 22 according to a fifth embodiment. As shown in FIG. 29, the first optical element 22 of the fifth embodiment has a folded portion 54 formed in one of adjacent side walls 22a that form one corner. The folded portion 54 serves as a connecting member that connects the adjacent side walls 22a that form one corner. The folded portion 54 is formed by extending one or both ends of the side wall 22a.

Figure 30A:
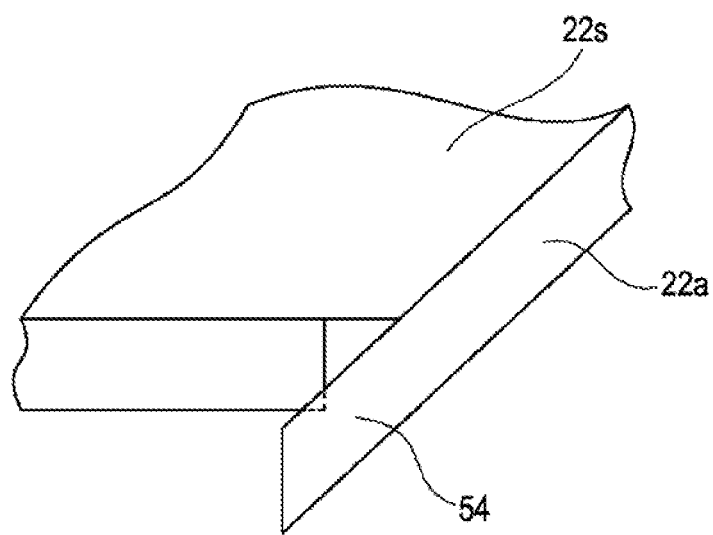
FIGS. 30A and 30B are process diagrams illustrating a process of forming the optical element according to the fifth embodiment.
Figure 30B:
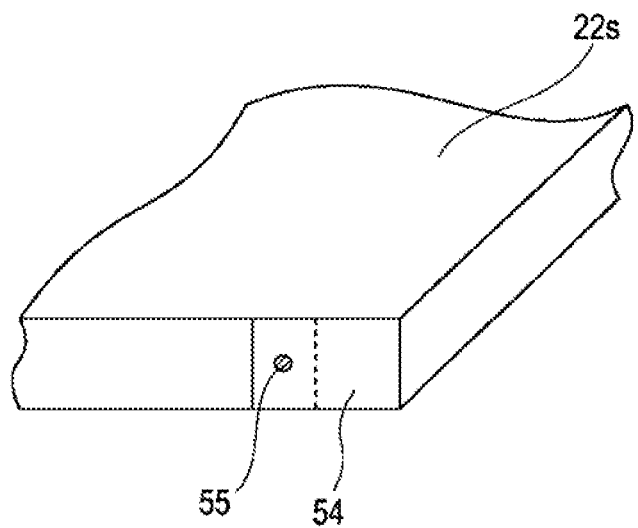

The folded portion 54 is formed as follows. First, as shown in FIG. 30A, the folded portion 54 is folded about the corner of the rectangular main surface member 22s. Then, as shown in FIG. 30B, the folded end is joined to the other side wall 22a by heat sealing or the like to form a joint 55. As a result, the side walls 22a installed upright at the two adjacent sides become connected to each other.

Alternatively, the side walls 22a installed upright at the two adjacent sides may be connected with a separate component.

The rest of the structure of the fifth embodiment is the same as the first embodiment.

6. Sixth Embodiment

Figure 31:
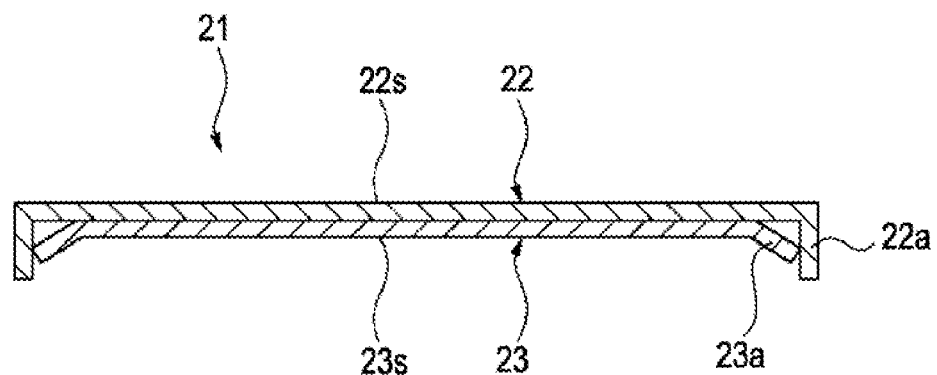
FIG. 31 is a cross-sectional view showing an example of a structure of an optical element laminate according to a sixth embodiment.

FIG. 31 shows a structural example of an optical element laminate 21 according to a sixth embodiment. As shown in FIG. 31, side walls 23a of the second optical element 23 are bended to spread outward. Thus, when the second optical element 23 is pushed into the space defined by the side walls 22a of the first optical element 22, force is applied to the side walls 22a of the first optical element 22 from the side walls 23a of the second optical element 23. The second optical element 23 is supported by the side walls 22a of the first optical element 22 by this force.

The rest of the structure of the sixth embodiment is the same as the first embodiment.

7. Seventh Embodiment

Figure 32:
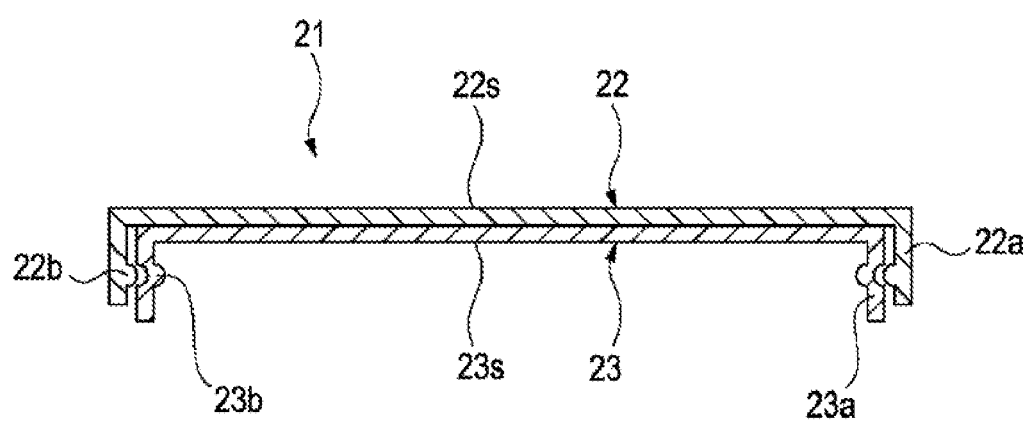
FIG. 32 is a cross-sectional view showing an example of a structure of an optical element laminate according to a seventh embodiment.
Figure 33:
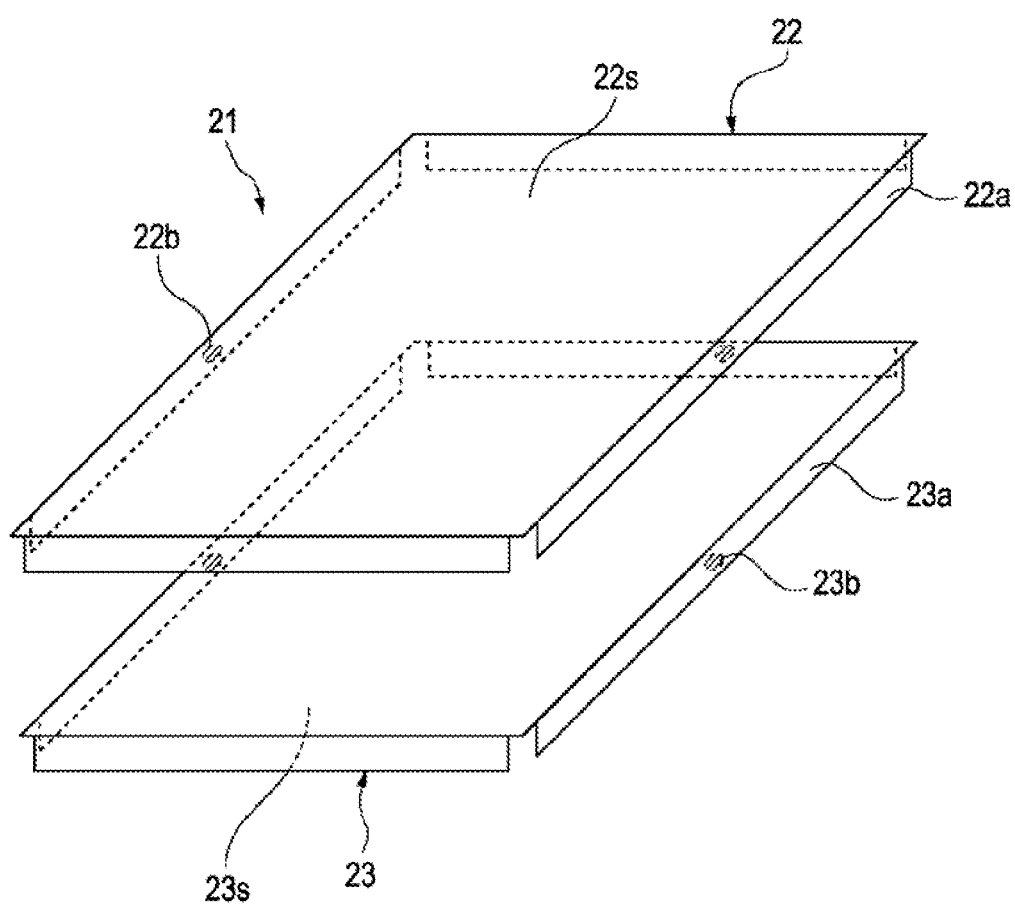
FIG. 33 is an exploded perspective view showing an example of a structure of an optical element laminate according to the seventh embodiment.

FIG. 32 is a cross-sectional view showing an example of a structure of an optical element laminate 21 according to a seventh embodiment. FIG. 33 is an exploded perspective view thereof. As shown in FIGS. 32 and 33, side walls 22a of a first optical element 22 have projections 22b and side walls 23a of a second optical element 23 have recesses 23b. The projections 22b is fitted into the recesses 23b to form a fit. In particular, the side walls 22a of the first optical element 22 have dot-shaped projections 22b at the inner sides facing the side walls 23a of the second optical element 23. The side walls 23a of the second optical element 23 have dot-shaped recesses 23b at the outer sides facing the side walls 22a of the first optical element 22. The projections 22b of the side walls 22a of the first optical element 22 are fitted into the recesses 23b of the side wall 23a of the second optical element 23.

Figure 34:
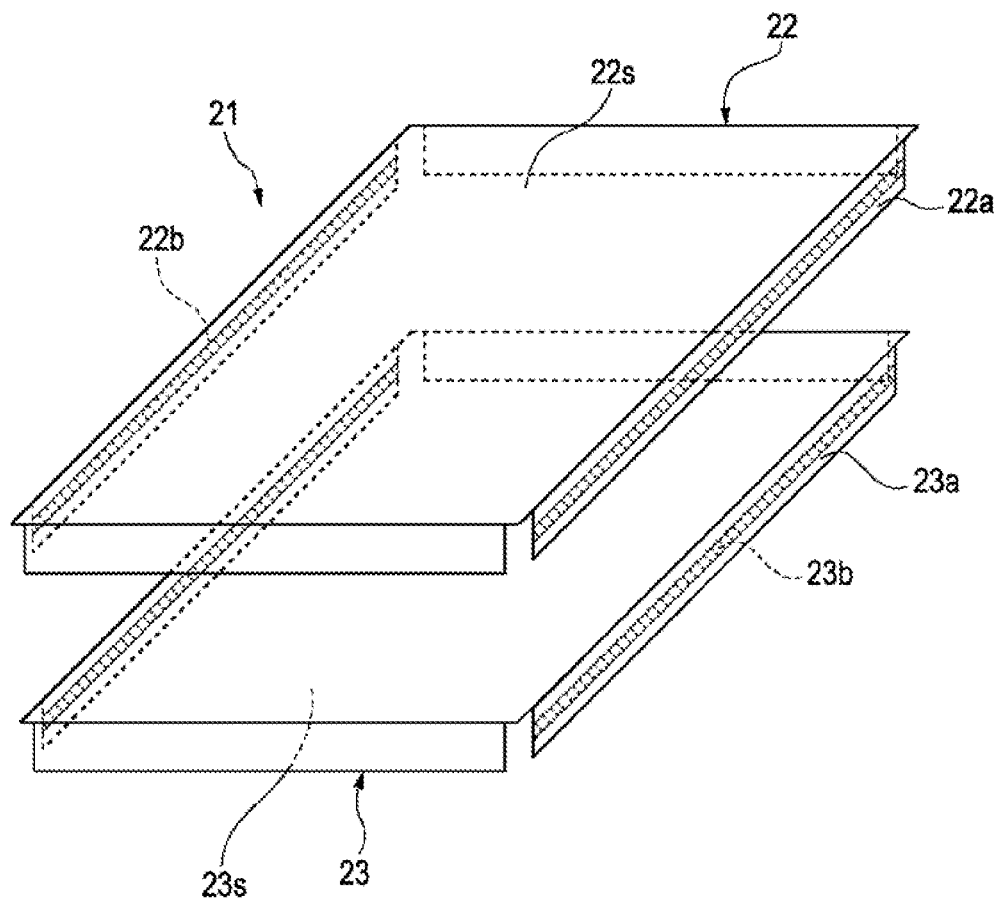
FIG. 34 is an exploded perspective view showing a modification of an optical element laminate according to the seventh embodiment.

Alternatively, as shown in FIG. 34, linear projections 22b may be provided to the side walls 22a of the first optical element 22 and linear recesses 23b may be provided to the side walls 23a of the second optical element 23 and the linear projections 22b may be fitted into the linear recesses 23b.

The rest of the structure of the seventh embodiment is the same as the first embodiment.

8. Eighth Embodiment

Figure 35:
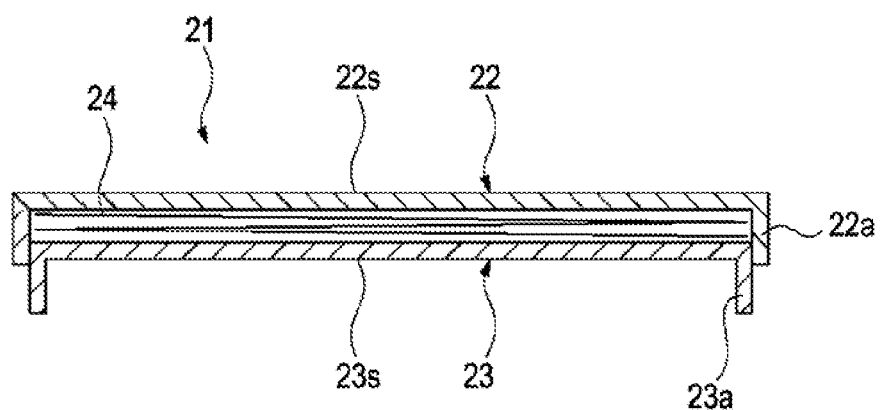
FIG. 35 is a cross-sectional view showing an example of a structure of an optical element laminate according to an eighth embodiment.

FIG. 35 is a cross-sectional view showing an example of a structure of an optical element laminate 21 according to an eighth embodiment. As shown in FIG. 35, a strip-shaped optical element 24 is zigzag folded and housed in the housing space formed between a first optical element 22 and a second optical element 23.

A method for making the optical element laminate 21 having the above-described structure will now be described with reference to FIGS. 36A to 36D.

Figure 36A:
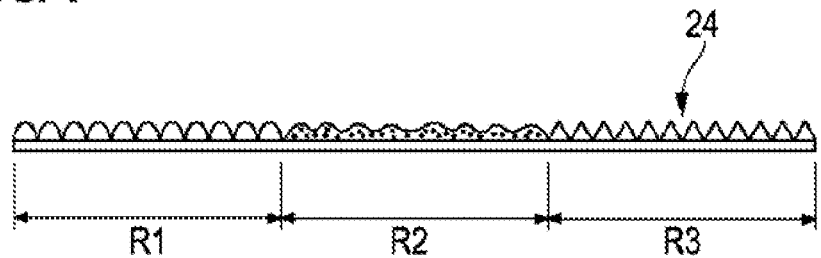
FIGS. 36A to 36D are process diagrams illustrating a method for making the optical element laminate according to the eighth embodiment.

First, as shown in FIG. 36A, a strip-shaped optical element 24 is prepared. The optical element 24 has a plurality of regions extending from one end to the other end in the longitudinal direction and each region is imparted an optical function corresponding to a desired optical characteristic. For example, the optical function may be a diffusing function, a condensing function, a polarizing and reflecting function, or a photovoltaic function. FIG. 36A shows an example in which three regions, R1, R2, and R3 are set from one end to the other end of the optical element 24. In a first region R1, for example, a non-uniformity-cancelling film is disposed. In a second region R2, for example, a diffusing film is disposed. In a third region R3, for example, a prism film is disposed.

Figure 36B:
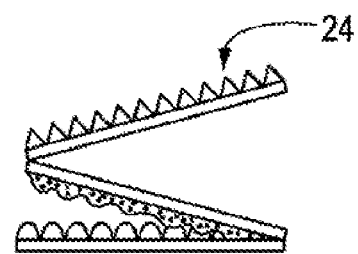
Figure 36C:
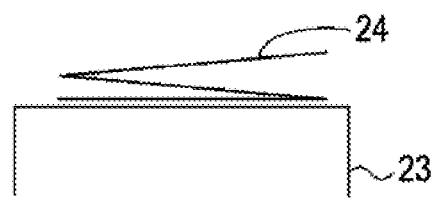
Figure 36D:
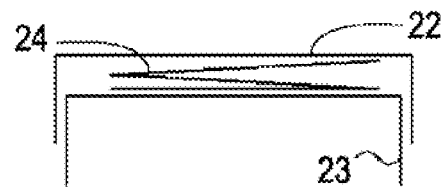

Next, as shown in FIG. 36B, the strip-shaped optical element 24 is folded in zigzag along boundaries of the regions. Then, as shown in FIG. 36C, the zigzag-folded optical element 24 is placed on the second optical element 23. As shown in FIG. 36D, the first optical element 22 is superimposed on the second optical element 23. As a result, the optical element 24 is housed in the housing space formed between the first optical element 22 and the second optical element 23.

As a result, a target optical element laminate 21 is obtained.

Figure 37:
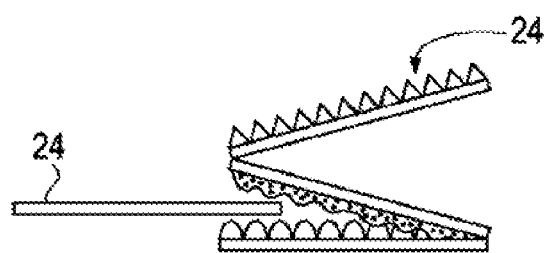
FIG. 37 is a cross-sectional view showing a modification of an optical element laminate according to the eighth embodiment.

Alternatively, as shown in FIG. 37, a film-, sheet-, or plate-shaped optical element 24 may be inserted into the folded strip-shaped optical element 24. Examples of the optical element 24 to be inserted include a diffusing plate, a diffusing sheet, and a lens sheet.

Figure 38A:
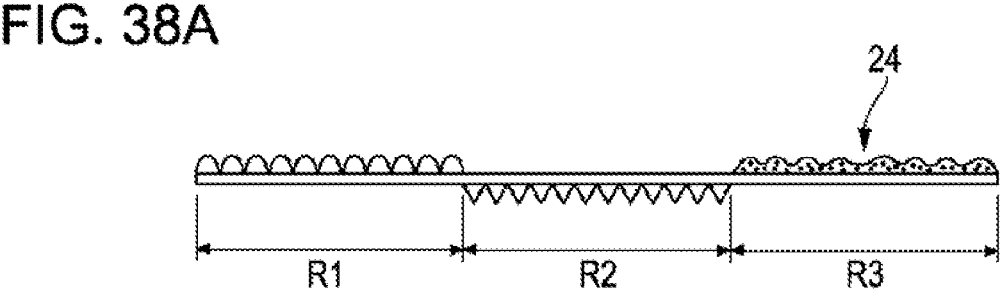
FIGS. 38A and 38B are cross-sectional views showing a modification of an optical element laminate according to the eighth embodiment.

Alternatively, as shown in FIG. 38A, optical functional layers may be formed on both sides of the strip-shaped optical element 24. In an example shown in FIG. 38A, a non-uniformity-cancelling lens is formed at the front surface side of the film in the first region, a prism lens is formed at the rear surface side of the film in the second region, and a diffusing layer is formed at the front surface side of the film in the third region.

Figure 38B:
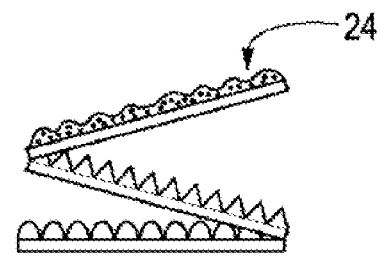

When the optical element 24 configured as such is zigzag folded, the optical functional layers can be arranged to face in the same direction, as shown in FIG. 38B. In other words, when the optical functional layers are selectively formed on the front and rear surfaces of the film, the optical functional layers can be arranged in the desired direction by folding the strip-shaped optical element 24 in zigzag.

9. Ninth Embodiment

Figure 39:
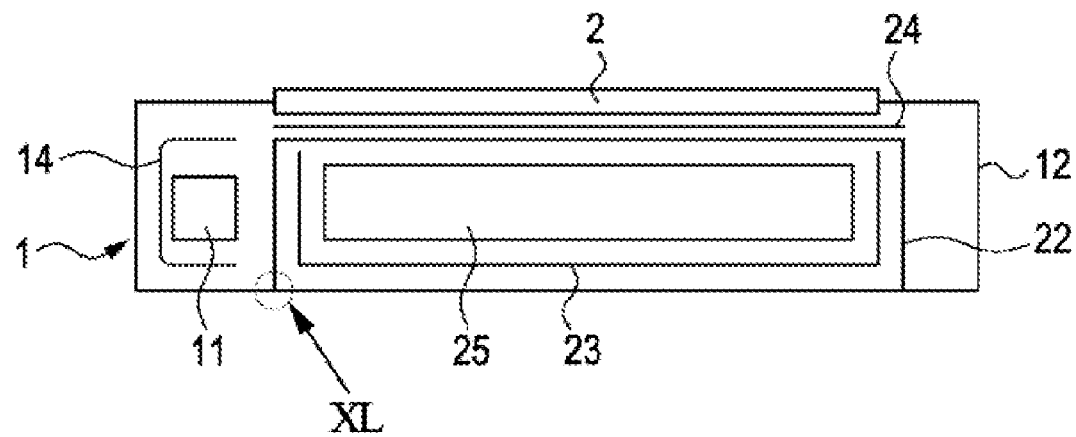
FIG. 39 is a cross-sectional view showing an example of a structure of a liquid crystal display apparatus according to a ninth embodiment.

FIG. 39 is a cross-sectional view showing an example of a structure of a liquid crystal display apparatus according to a ninth embodiment. As shown in FIG. 39, the liquid crystal display apparatus includes a backlight 1 configured to emit light and a liquid crystal panel 2 configured to display images on the basis of light emitted from the backlight 1.

The backlight 1 is a backlight unit of a side-light-type (a.k.a. edge light-type) and includes one or more light sources 11, an optical element laminate 21, and a casing 12 configured to house the one or more light sources 11 and the optical element laminate 21. If necessary, a sheet- or film-shaped optical element 24 may be further provided between the optical element laminate 21 and the liquid crystal panel 2. Moreover, a reflector 14 that covers the light sources 11 may be further provided.

Figure 40:
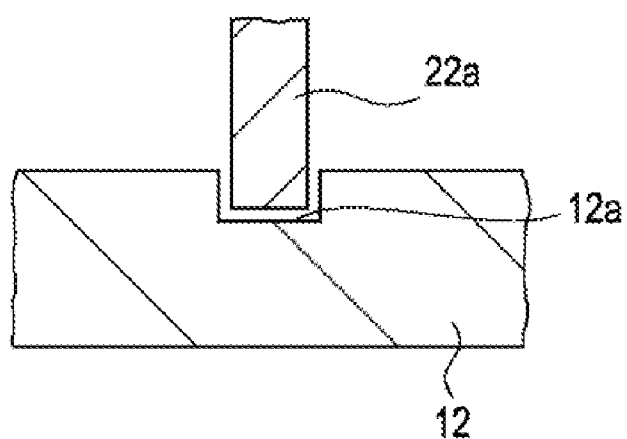
FIG. 40 is an enlarged cross-sectional view showing a modification of a liquid crystal display apparatus according to the ninth embodiment.

FIG. 40 is an enlarged view of a portion marked in FIG. 39. As shown in FIG. 40, preferably, a groove 12a is formed in the inner surface of the casing 12 and the tip of a side wall 22a of the first optical element 22 constituting the optical element laminate 21 is fit into the groove 12a. In this manner, the position of the optical element laminate 21 in the backlight 1 can be affixed.

Figure 41:
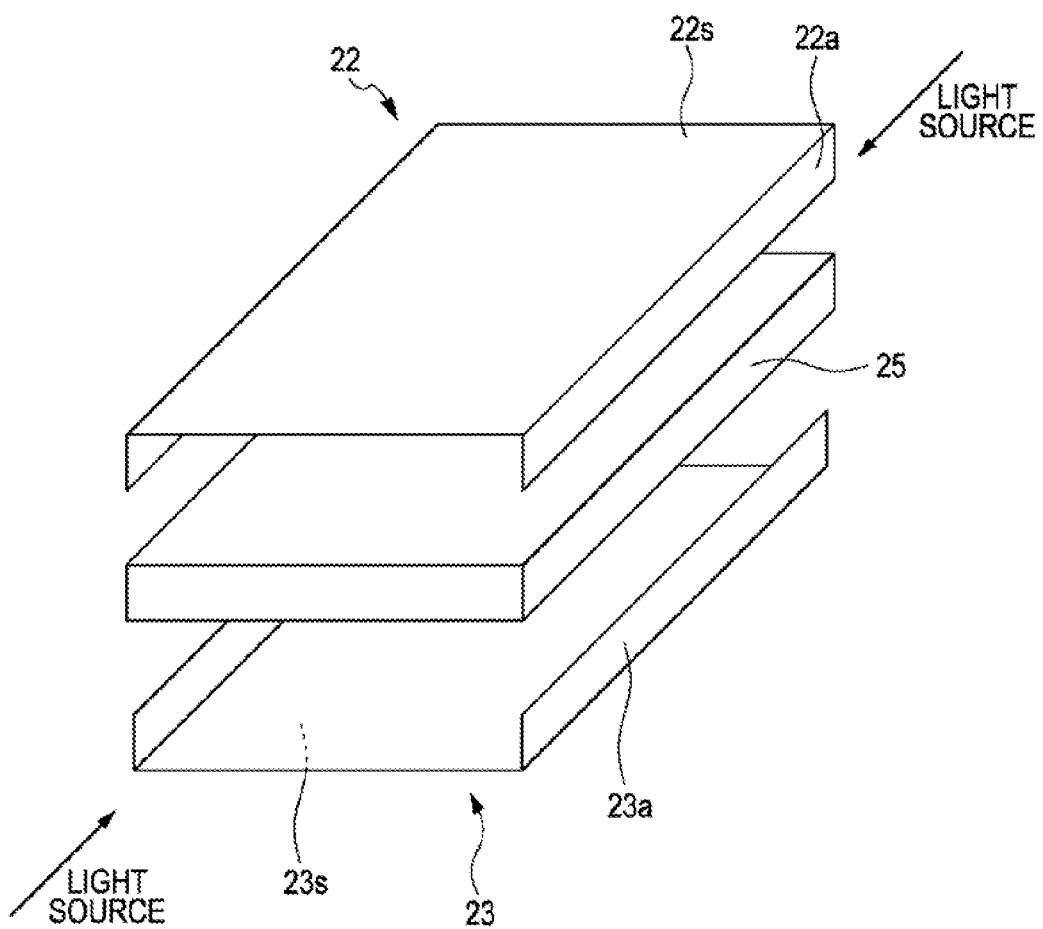
FIG. 41 is an exploded perspective view showing an example of a structure of an optical element laminate according to the ninth embodiment.

FIG. 41 shows a structural example of the optical element laminate 21 according to the ninth embodiment. As shown in FIG. 41, the first optical element 22 has a rectangular main surface member 22s and two side walls 22a formed at two opposing sides of the main surface member 22s among the four sides of the main surface member 22s. Similarly, a second optical element 23 has a rectangular main surface member 23s and two side walls 23a formed at two opposing sides of the main surface member 23s among the four sides of the main surface member 23s. The first optical element 22 is superimposed on the second optical element 23 so that the side walls 22a of the first optical element 22 extend in a direction opposite the direction in which the side walls 23a of the second optical element 23 extend and that the side walls 22a and the side walls 23a overlap each other.

As shown in FIG. 41, a light-guide plate 25 is housed in a housing space formed between the first optical element 22 and the second optical element 23. The light-guide plate 25 is rectangular in shape. In other words, the light-guide plate 25 has a first main surface opposing the liquid crystal panel 2, a second main surface opposite the first main surface, and four side surfaces located between the first main surface and the second main surface. Of the surfaces of the light-guide plate 25, two opposing side surfaces or one side surface remains exposed without being covered with the side walls 22a of the first optical element 22 or the side walls 23a of the second optical element 23. Light from the light sources 11 enters the light-guide plate 25 from the exposed side surfaces.

The light-guide plate 25 is, for example, plate-shaped or tapered with its thickness gradually decreasing from the end at which the light source is disposed toward the opposite end. A transparent plastic such as polymethyl methacrylate (PMMA) can be used as the material for the light-guide plate 25. A dot pattern for scattering and reflecting the light that has entered the light-guide plate 25 is formed on the second main surface of the light-guide plate 25. This dot pattern can be formed by, for example, a printing technique in which reflecting dots are printed with a white ink or a forming technique in which irregularities are formed by using a stamper or an ink jet technique.

Figure 42:
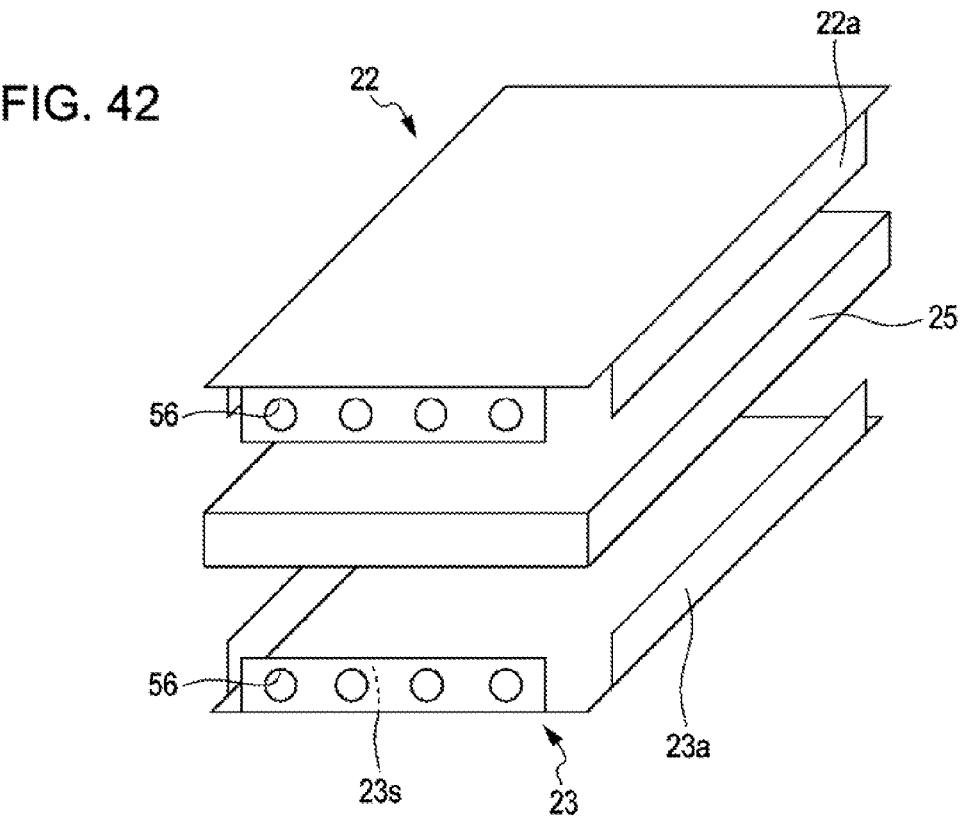
FIG. 42 is an exploded perspective view showing a modification of an optical element laminate according to the ninth embodiment.

When surfaces of the light-guide plate 25 are enclosed by the first optical element 22 and the second optical element 23, as shown in FIG. 42, openings 56 may be formed in the side walls 22a of the first optical element 22 and/or the side walls 23a of the second optical element 23, for example, at positions facing the light sources 11 so that light from the light sources 11, such as point light sources (e.g., LEDs), can enter the light-guide plate 25 through the openings 56.

Figure 43:
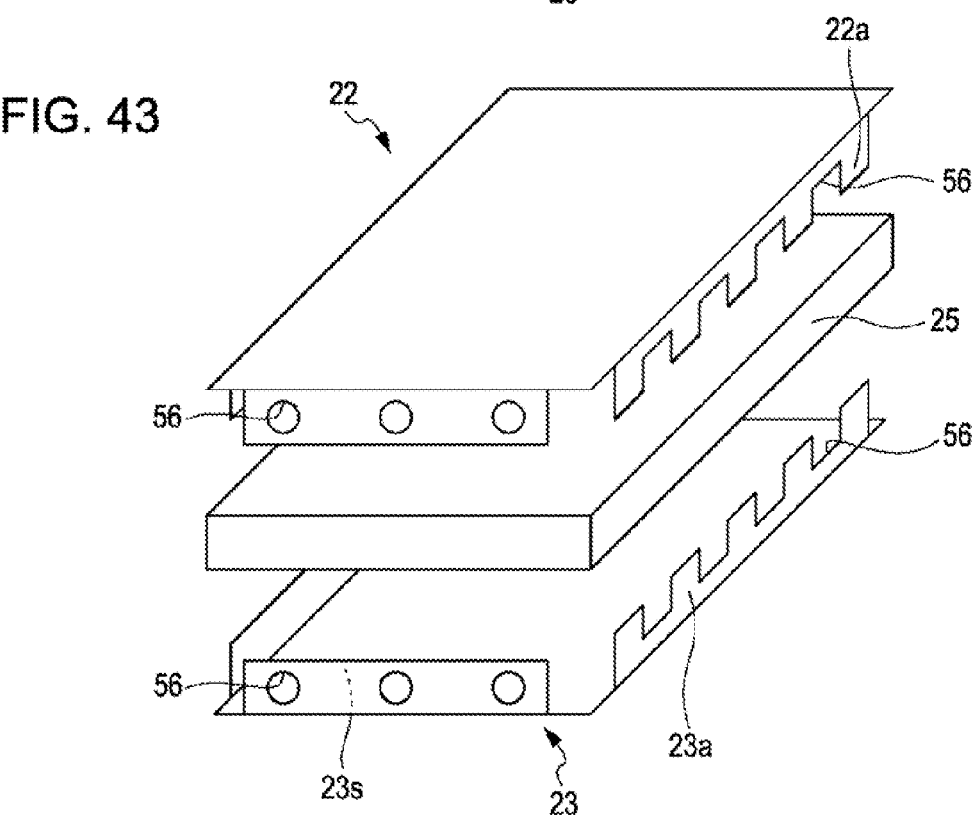
FIG. 43 is an exploded perspective view showing another modification of an optical element laminate according to the ninth embodiment.

In the case where light from the light sources 11 enters the light-guide plate 25 from two or more side surfaces, as shown in FIG. 43, openings 56 may be formed in the first, optical element 22 and/or the second optical element 23 that covers the side surfaces. The openings 56 are not limited to holes. The side walls 22a of the first optical element 22 and/or the side wall 23a of the second optical element 23 may be grooved to form grooves with protrusions and recesses.

The figures, shapes, materials, and structures described in the embodiments above are merely examples, and any other figures, shapes, materials, and structures may be used as occasion demands.

Furthermore, the structures of the above-described embodiments can be combined with one another within the range of the present application.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An optical element laminate comprising:
a first optical element; a second optical element superimposed with the first optical element; and
a third optical element disposed in a housing space between the first optical element and the second optical element;
wherein the first optical element and the second optical element are each a rectangular film or sheet, the first optical element has at least two side walls at two opposing sides among four sides of the first optical element and the second optical element has at least two side walls at two opposing sides among four sides of the second optical element,
wherein the first optical element, the second optical element, and the third optical element are in close contact with one another; and
wherein the third optical element has a strip shape,
a plurality of optical sub-elements are formed side-by-side from one end of the strip-shaped third optical element to the other, and
the third optical element is folded along boundaries between the optical sub-elements.

2. The optical element laminate according to claim 1, further comprising:
one or more film-shaped, sheet-shaped, or plate-shaped optical elements disposed between the optical sub-elements of the folded third optical element.

3. The optical element laminate according to claim 1, wherein the entire periphery of the third optical element is enclosed by the side walls of the first optical element and/or the second optical element.

4. An optical element laminate comprising:
a first optical element; and
a second optical element superimposed with the first optical element;
wherein the first optical element and the second optical element are each a rectangular film or sheet, and
the first optical element has at least two side walls at two opposing sides among four sides of the first optical element and the second optical element has at least two side walls at two opposing sides among four sides of the second optical element,
wherein two side walls disposed at adjacent two sides defining one angle is connected with a connecting member.

5. A backlight comprising a light source configured to emit light; and an optical element laminate according to claim 4 through which light from the light source passes.

6. A liquid crystal display apparatus comprising a backlight configured to emit light; and a liquid crystal panel configured to display images on the basis of light emitted from the backlight, the backlight including a light source to emit light, and an optical element laminate according to claim 4 through which light from the light source passes.

7. A backlight comprising:
a light source configured to emit light; and
an optical element laminate through which light from the light source passes,
the optical element laminate including
a first optical element, a second optical element superimposed with the first optical element, and
a third optical element disposed in a housing space between the first optical element and the second optical element,
wherein the first optical element and the second optical element are each a rectangular film or sheet, and
the first optical element has at least two side walls at two opposing sides among four sides of the first optical element and the second optical element has at least two side walls at two opposing sides among four sides of the second optical element, and
wherein the first optical element, the second optical element, and the third optical element are in close contact with one another; and
wherein the third optical element has a strip shape,
a plurality of optical sub-elements are formed side-by-side from one end of the strip-shaped third optical element to the other, and
the third optical element is folded along boundaries between the optical sub-elements.

8. A liquid crystal display apparatus comprising:
a backlight configured to emit light; and
a liquid crystal panel configured to display images on the basis of light emitted from the backlight,
the backlight including
a light source configured to emit light, and
an optical element laminate through which light from the light source passes,
the optical element laminate including
a first optical element, and
a second optical element superimposed with the first optical element,
a third optical element disposed in a housing space between the first optical element and the second optical element,
wherein the first optical element and the second optical element are each a rectangular film or sheet, and
the first optical element has at least two side walls at two opposing sides among four sides of the first optical element and the second optical element has at least two side walls at two opposing sides among four sides of the second optical element, and
wherein the first optical element, the second optical element, and the third optical element are in close contact with one another; and
wherein the third optical element has a strip shape,
a plurality of optical sub-elements are formed side-by-side from one end of the strip-shaped third optical element to the other, and
the third optical element is folded along boundaries between the optical sub-elements.

* * * * *